United States Patent
Ida et al.

(10) Patent No.: US 7,136,665 B2
(45) Date of Patent: Nov. 14, 2006

(54) MOBILE COMMUNICATIONS SYSTEM AND METHOD FOR CONTROLLING TRANSMISSION POWER

(75) Inventors: Tohru Ida, Kawasaki (JP); Hirokatsu Nara, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 504 days.

(21) Appl. No.: 09/972,593

(22) Filed: Oct. 5, 2001

(65) Prior Publication Data
US 2002/0082036 A1    Jun. 27, 2002

(30) Foreign Application Priority Data
Dec. 27, 2000    (JP)    ............................. 2000-398740

(51) Int. Cl.
*H04B 7/00* (2006.01)
*H04Q 7/20* (2006.01)
*H04M 1/00* (2006.01)

(52) U.S. Cl. ..................... 455/522; 455/436; 455/440; 455/456.5; 455/525; 455/560

(58) Field of Classification Search ................ 455/522, 455/414.2, 412, 422.1, 432.1, 436, 437, 438, 455/439, 440, 442, 452.2, 456.5, 524, 525, 455/115.3, 127.2
See application file for complete search history.

(56) References Cited

U.S. PATENT DOCUMENTS

| | | | | |
|---|---|---|---|---|
| 5,798,732 | A * | 8/1998 | Eshenbach | 342/357.12 |
| 6,061,337 | A * | 5/2000 | Light et al. | 370/331 |
| 6,061,561 | A * | 5/2000 | Alanara et al. | 455/456.1 |
| 6,351,651 | B1 * | 2/2002 | Hamabe et al. | 455/522 |
| 6,438,376 | B1 * | 8/2002 | Elliott et al. | 455/437 |
| 6,473,619 | B1 * | 10/2002 | Kong et al. | 455/456.1 |
| 6,487,191 | B1 * | 11/2002 | Kang et al. | 370/342 |
| 6,487,411 | B1 * | 11/2002 | Laakso et al. | 455/437 |
| 6,532,363 | B1 * | 3/2003 | Pussinen | 455/435.1 |
| 6,628,958 | B1 * | 9/2003 | Kamel et al. | 455/522 |
| 6,708,041 | B1 * | 3/2004 | Butovitsch et al. | 455/522 |
| 6,731,949 | B1 * | 5/2004 | Hamabe et al. | 455/522 |
| 6,735,447 | B1 * | 5/2004 | Muller | 455/522 |
| 6,760,597 | B1 * | 7/2004 | Salvarani et al. | 455/522 |
| 6,845,246 | B1 * | 1/2005 | Steer | 455/522 |
| 2002/0018451 | A1 * | 2/2002 | Sharony | 370/329 |
| 2002/0077140 | A1 * | 6/2002 | Monogioudis et al. | 455/522 |
| 2002/0082013 | A1 * | 6/2002 | Lee et al. | 455/436 |

FOREIGN PATENT DOCUMENTS

JP    06244782    9/1994

* cited by examiner

*Primary Examiner*—Binh K. Tieu
(74) *Attorney, Agent, or Firm*—Katten Muchin Rosenman LLP

(57) ABSTRACT

A mobile communications system, designed to enable the overall amount of power emitted to be kept down, provided with a mobile station location information generating unit for generating location information indicating a present location of a mobile station when transmitting a request for increasing the transmission power from the mobile station in the middle of handover with base transceiver stations, a base transceiver station location information generating unit for generating location information indicating a present location of the base transceiver stations, a base transceiver station specifying unit for specifying one base transceiver station nearest to the mobile station from said location information, and a transmission power control unit for instructing an increase of the transmission power in only the specified base transceiver station.

18 Claims, 14 Drawing Sheets

MOBILE COMMUNICATIONS SYSTEM AND METHOD FOR CONTROLLING TRANSMISSION POWER

BACKGROUND OF THE INVENTION

1. Field of the Invention

The present invention relates to a method for controlling transmission power when transmitting a radio signal from a base transceiver station to a mobile station in a mobile communications system, for example, a CDMA mobile communications system, where a mobile station (MS) is able to receive and combine signals from a plurality of base transceiver stations (BTS). In particular, it relates to a method for controlling transmission power in the middle of handover.

2. Description of the Related Art

In the above CDMA mobile communications system etc., since the same frequency bandwidth is shared by a plurality of communicating parties, the signal of one communicating party becomes an interference signal for the signal of another communicating party, so it is desirable to keep the transmission power of the radio signals used by communicating parties as low as possible.

Further, when a mobile station near to a base transceiver station and a mobile station far from the base transceiver station simultaneously communicate with the base transceiver station, if the transmission power of the uplink signals from the mobile stations are the same, the base transceiver station receives the uplink transmission signal from the near mobile station at a high power level, while receives the uplink transmission signal from the far mobile station at a low power level. Therefore, the signal from the far mobile station receives strong interference due to the signal from the near mobile station and the quality of the signal from the far mobile station received by the base transceiver station degrades to a large extent, that is, a "far/near problem" occurs. As a technique for solving this far/near problem, methods for controlling the transmission power have been studied.

Looking at the control of for example the downlink transmission power during a soft handover in a CDMA mobile communications system, if a mobile station receives signals from a first base transceiver station and second base transceiver station communicating with it, the received signals are despread, then combined and the quality of reception after combination is measured by the mobile station. For example, the ratio of the level of reception of the interference wave with respect to the level of reception of the desired wave, that is, the SIR, is measured by the mobile station and the measured SIR is compared with the target SIR. When the result of the comparison is that the measured SIR is determined to be larger than the target SIR, the mobile station sends transmission power control information instructing a reduction of the transmission power of the transmitted signal from the base transceiver station to the mobile station, while conversely when the result is that the measured SIR is judged to be smaller than the target SIR, it sends transmission power control information instructing an increase of the transmission power of the transmitted signal from the base transceiver station to the mobile station. The first and second base transceiver stations raise and lower the transmission power to the mobile station based on the transmission power control information received from the mobile station. In this way, the transmission power is controlled so that the SIR measured by the mobile station becomes constant regardless of the present location of the mobile station.

Summarizing the problem to be solved by the invention, in the control of the downlink transmission power during a soft handover by each base transceiver station, when a mobile station is temporarily hidden in the shadow of a building etc., the level of reception of the mobile station falls. Therefore, the mobile station sends transmission power control information instructing an increase of the transmission power to the base transceiver station in the middle of soft handover. The base transceiver stations work to improve the quality of the received signal at the mobile station by raising the transmission power in accordance with the transmission power control information received from the mobile station.

During soft handover, however, since one mobile station is communicating with a plurality of base transceiver stations, if information requesting an increase of transmission power is sent from the mobile station, the transmission powers from all of the plurality of base transceiver stations end up rising simultaneously by exactly the same amount. Therefore, an increase in the overall amount of power emitted in the CDMA mobile communications system is caused. Along with this, a reduction in the subscriber capacity is caused. Still further, interference with other mobile stations in the middle of communication around that mobile station is caused.

SUMMARY OF THE INVENTION

An object of the present invention is to provide, in view of the above problems, a method for realizing downlink transmission power control keeping down as much as possible the amount of power emitted from base transceiver stations in the middle of handover and a mobile communications system, base transceiver station, mobile station, and base transceiver station host equipment using the same.

To attain the above object, the mobile communications system of the present invention is provided with a mobile station location information generating means (11) for generating location information indicating a present location of a mobile station (3) when transmitting a request for increasing the transmission power from the mobile station (3) in the middle of handover with base transceiver stations (2), a base transceiver station location information generating means (12) for generating location information indicating a present location of the base transceiver stations (2), a base transceiver station specifying means (13) for specifying one base transceiver station nearest to the mobile station (3) from said location information, and a transmission power control means (14) for instructing an increase of the transmission power in only the specified base transceiver station. Due to this, it is possible to keep down the overall amount of power emitted in the mobile communications system.

More specifically, the present invention includes the following aspects:

[First Aspect] A method for controlling transmission power at the time of handoff for transmitting the same data from at least two base transceiver stations among a plurality of base transceiver stations to a mobile station in a mobile communications system including a plurality of base transceiver stations, said method for controlling transmission power comprising the steps of:

specifying a base transceiver station with a large receiving power among at least said two base transceiver stations based on a signal from said mobile station, receiving a request for raising the transmission power from said mobile station in said at least two base transceiver stations, and raising the transmission power of a transmission signal to said mobile station in said specified base transceiver station without raising the transmission power in all or at least one of the unspecified base transceiver stations among the base transceiver stations receiving the request.

Note that "based on a signal from said mobile station" means having a plurality of base transceiver stations receive a signal from the mobile station and utilizing the received field strengths of the signal at the different base transceiver stations, having the mobile station receive signals from at least two base transceiver stations, measuring the received field strengths of the different received signals, and sending a signal including the measured received field strength information (including information obtained by the mobile station processing information enabling the base transceiver station host equipment to identify the base transceiver station with the greatest received field strength in addition to the received field strengths themselves) to the base transceiver stations, and utilizing that information, etc.

[Second Aspect] A mobile station used in a mobile communications system including at least two base transceiver stations provided with a handoff function for transmitting the same data to one mobile station and provided with the function of controlling a transmission power so as to raise the transmission power in the base transceiver station nearest to said mobile station among said at least two base transceiver stations and not raise the transmission power in all or part of the other base transceiver stations when said at least two base transceiver stations receive a request for raising the transmission power from said mobile station at the time of execution of a handoff function, said mobile station provided with:

a requesting means for transmitting a request for raising the transmission power at the time of handoff and a mobile station location information generating means for measuring the position of the mobile station and transmitting the measured location information to a communicating base transceiver station before transmitting the request when the quality of the received signal from the communicating base transceiver station falls below a predetermined quality.

Note that regarding the "predetermined quality", when the quality (for example, received field strength) of a signal received from a base transceiver station in communication with it is below a predetermined quality (for example, level), which is a condition for transmission of a signal reporting the received field strengths of signals received from the base transceiver station in communication with it and another base transceiver station adjoining that base transceiver station and triggering the conditional start of handover, the mobile station transmits the measured location information of that mobile station to the base transceiver station in communication with it. Alternatively, this is when a quality above that predetermined quality (for example, a level of that level plus a predetermined level) is not reached.

[Third Aspect] A mobile station as set forth in the second aspect, wherein said mobile station location information generating means transmits the location information of the mobile station from the start of handoff to the end of handoff periodically or in accordance with the change in position of that station.

Note that the above "periodically" means every predetermined time interval, while "in accordance with the change in position of that station" means for example when the mobile station has moved by a predetermined distance or when the distance moved in a predetermined time exceeds a predetermined distance.

BRIEF DESCRIPTION OF THE DRAWINGS

The above object and features of the present invention will be more apparent from the following description of the preferred embodiments given with reference to the accompanying drawings, wherein.

DESCRIPTION OF THE PREFERRED EMBODIMENTS

Preferred embodiments of the present invention will be described in detail below while referring to the attached figures.

First, an explanation will be given of the mobile communications system on which the present invention is predicated.

Figure 16:
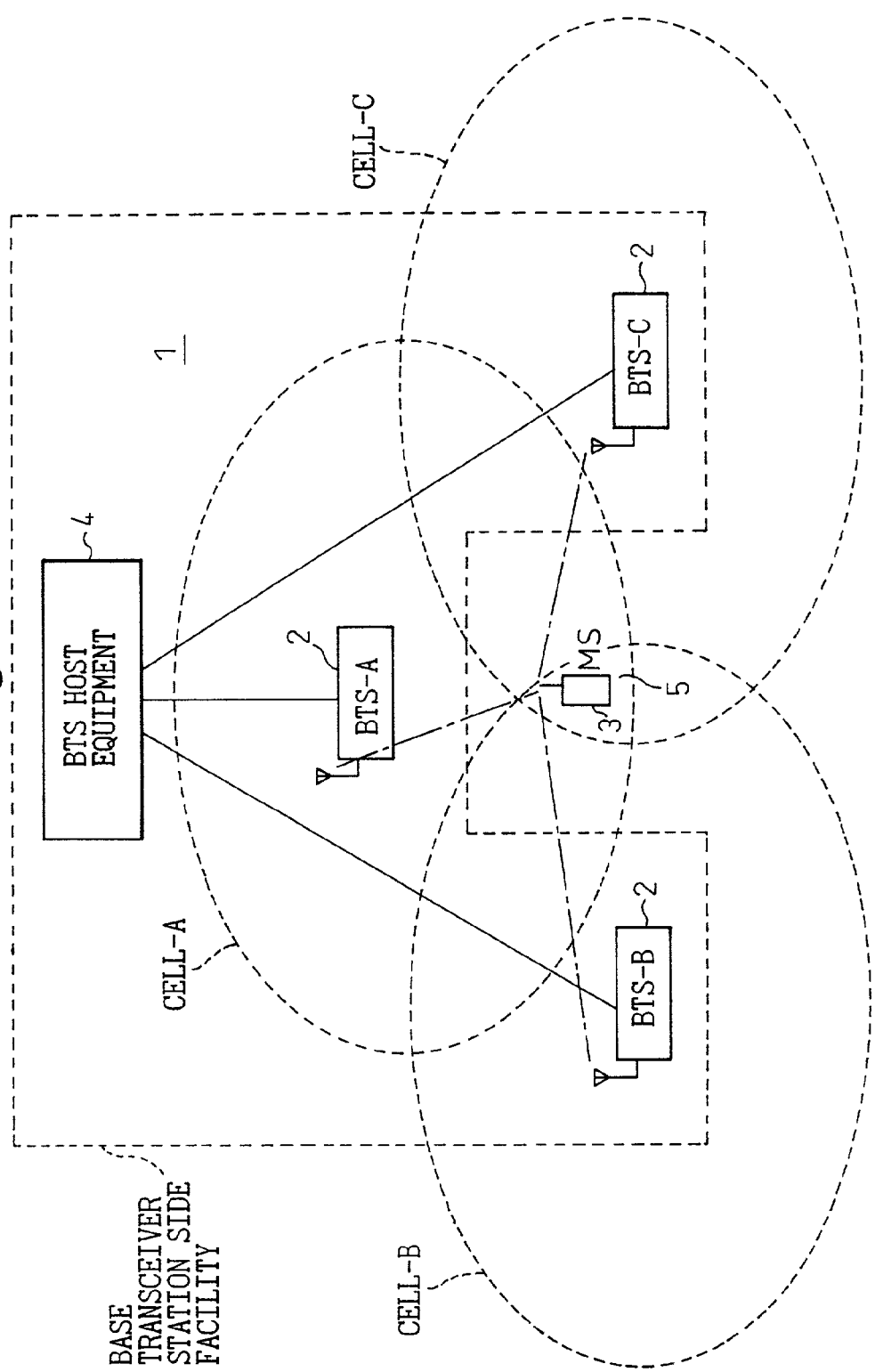
FIG. 16 is a view of an example of the configuration of a general mobile communications system.

FIG. 16 is a view of an example of the configuration of a general mobile communications system, for example, a CDMA mobile communications system.

The mobile communications system 1 is comprised of a mobile station 3 (only one shown for simplification) and base transceiver station side facilities comprised of two or more adjoining (or not adjoining—the arrangement not being in particular issue so long as transmission of the same data to a single mobile station is possible) base transceiver stations 2 (as an example, three base transceiver stations A, B, and C are shown) and a base transceiver station controller for controlling the base transceiver stations 2, a gateway switch, or another base transceiver station host equipment 4.

The base transceiver stations (A, B, and C) form a cell A, cell B, and cell C of radio communication zones. For example, a mobile station in the cell A communicates with another party through a radio channel with the base transceiver station (A) 2.

When however the mobile station moves and changes its present location and, as in the case of the illustrated mobile station 3, enters a region 5 where it can communicate with both the base transceiver station (B) 2 and the base transceiver station (C) 2, the radio channel with the base transceiver station currently used by the mobile station 3 has to be switched from the base transceiver station A to the base transceiver station B or from the base transceiver station A to the base transceiver station C. This switching is mainly determined by the base transceiver station host equipment 4 in accordance with the magnitude of the levels of reception of the signals from the base transceiver stations 2 at the mobile station 3. At the time of switching, the same data is transmitted from the base transceiver station (A, B (or A, C) etc) to the same mobile station. This state is called "handover". In particular, in a CDMA system, "soft handover" where there is no break in the sound during conversation is possible. The present invention relates to control of the downlink transmission power to a mobile station at the base transceiver stations in the middle of such handover.

Note that when moving from the cell A to B, the same data is transmitted from the base transceiver station A and the base transceiver station B to the mobile station 3 (during handover), and the mobile station combines the signals received from the base transceiver stations A and B. Note that when moving from the cell A to C, the base transceiver stations A and C operate in the same way.

Figure 1:
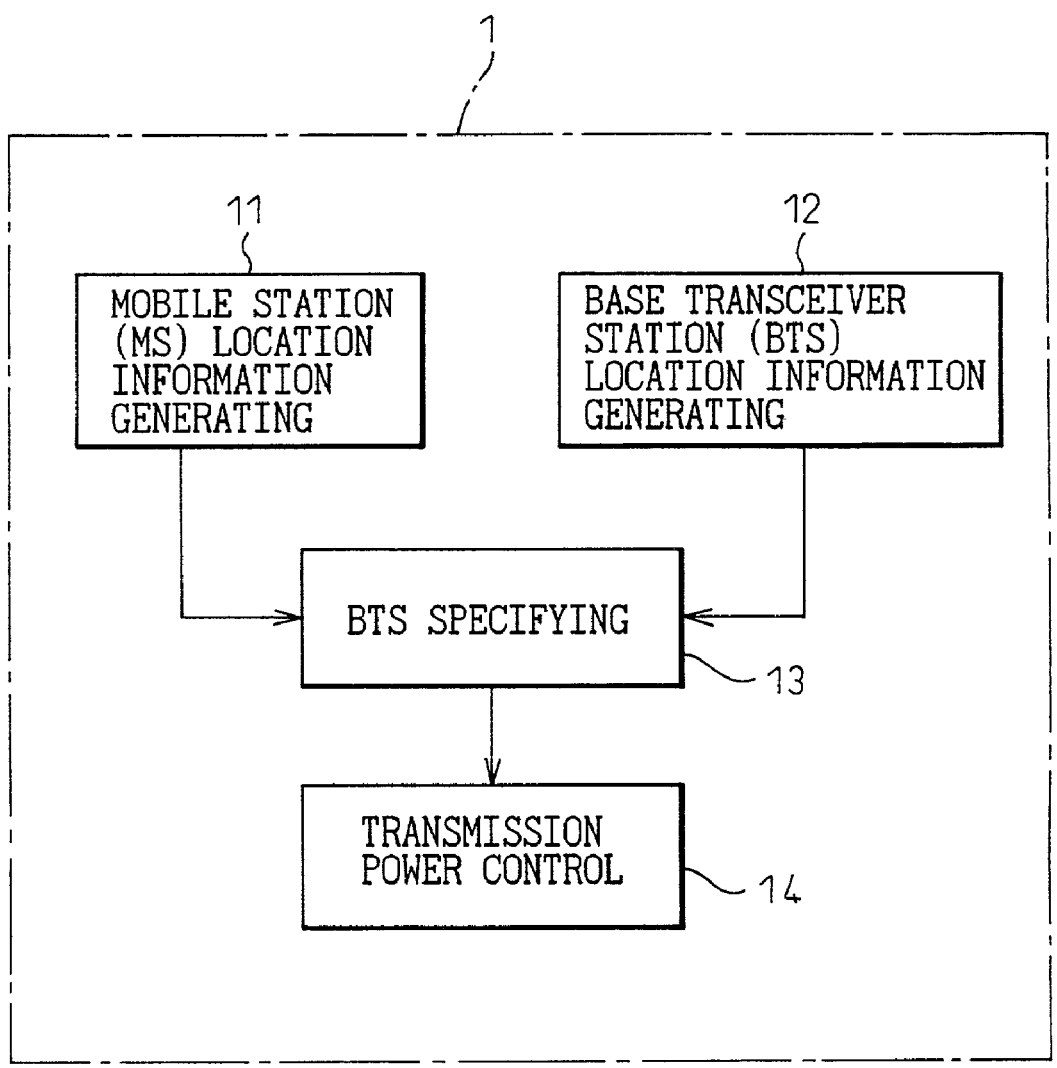
FIG. 1 is a view of the basic configuration of a mobile communications system according to the present invention.

FIG. 1 is a view of the basic configuration of a mobile communications system according to the present invention.

The mobile communications system 1 according to the present invention is a mobile communications system having at least a plurality of base transceiver stations 2 and in principle includes the illustrated four means 11 to 14.

The mobile station location information generating means 11, when provided in a mobile station, transmits location information of the mobile station measured by the mobile station to a base transceiver station in communication with it when the quality of the signal received from the base transceiver station in communication with it falls below a predetermined quality. For example, when the quality (for example, received field strength) of a signal received from a base transceiver station in communication with it is below a predetermined quality (for example, level), which is a condition for transmission of a signal reporting the received field strengths of signals received from the base transceiver station in communication with it and another base transceiver station adjoining that base transceiver station and triggering the conditional start of handover, the means transmits the location information of that mobile station measured by that mobile station to the base transceiver station in communication with it. Alternatively, this is when a quality above that predetermined quality (for example, a level of that level plus a predetermined level) is not reached.

Note that the location of the mobile station is preferably measured when the quality of the signal received from the base transceiver station in communication with it falls below a predetermined quality, but may also be measured periodically. Note that it is preferably measured periodically during handover. Further, it is again preferably measured periodically after completion of handover (after the transmission of the same data from a plurality of base transceiver stations to a single mobile station ends) or only when the quality of the signal received from a base transceiver station in communication with it falls below a predetermined quality. On the other hand, for the transmission of the location information as well, during handover, the measured location information is preferably transmitted periodically or is transmitted in accordance with a change in the location of the mobile station when it moves by a predetermined distance with a predetermined time. After the end of handover (after the transmission of the same data from a plurality of base transceiver stations to a single mobile station ends), the information is preferably again transmitted periodically or transmitted only when the quality of the signal received from the base transceiver station in communication with it falls below a predetermined quality.

The base transceiver station location information generating means 12 generates base transceiver station location information including at least the base transceiver station forming the area in which the mobile station 3 belongs and indicating the present location of at least one base transceiver station adjoining that base transceiver station.

The base transceiver station specifying means 13 specifies the one base transceiver station 2 nearest to the mobile station 3 from the above mobile station location information and base transceiver station location information.

The transmission power control means 14 controls the transmission power to raise the transmission power in the specified base transceiver station 2.

Note that control is performed so as not to raise the transmission power in all of the base transceiver station not specified among the plurality of adjoining base transceiver stations or not to raise the transmission power in at least one of those base transceiver stations. Note that as a candidate for that at least one base transceiver station, the base transceiver station farthest from the mobile station may be mentioned. In this case, it is necessary to provide a farthest base transceiver station specifying unit for specifying the base transceiver station farthest from the mobile station by computation using the location information of the mobile station and the location information of the base transceiver stations.

Note that the means 11 to 14 are formed in the mobile communications system comprised by the base transceiver station side facilities including the mobile station 3.

Figure 2:
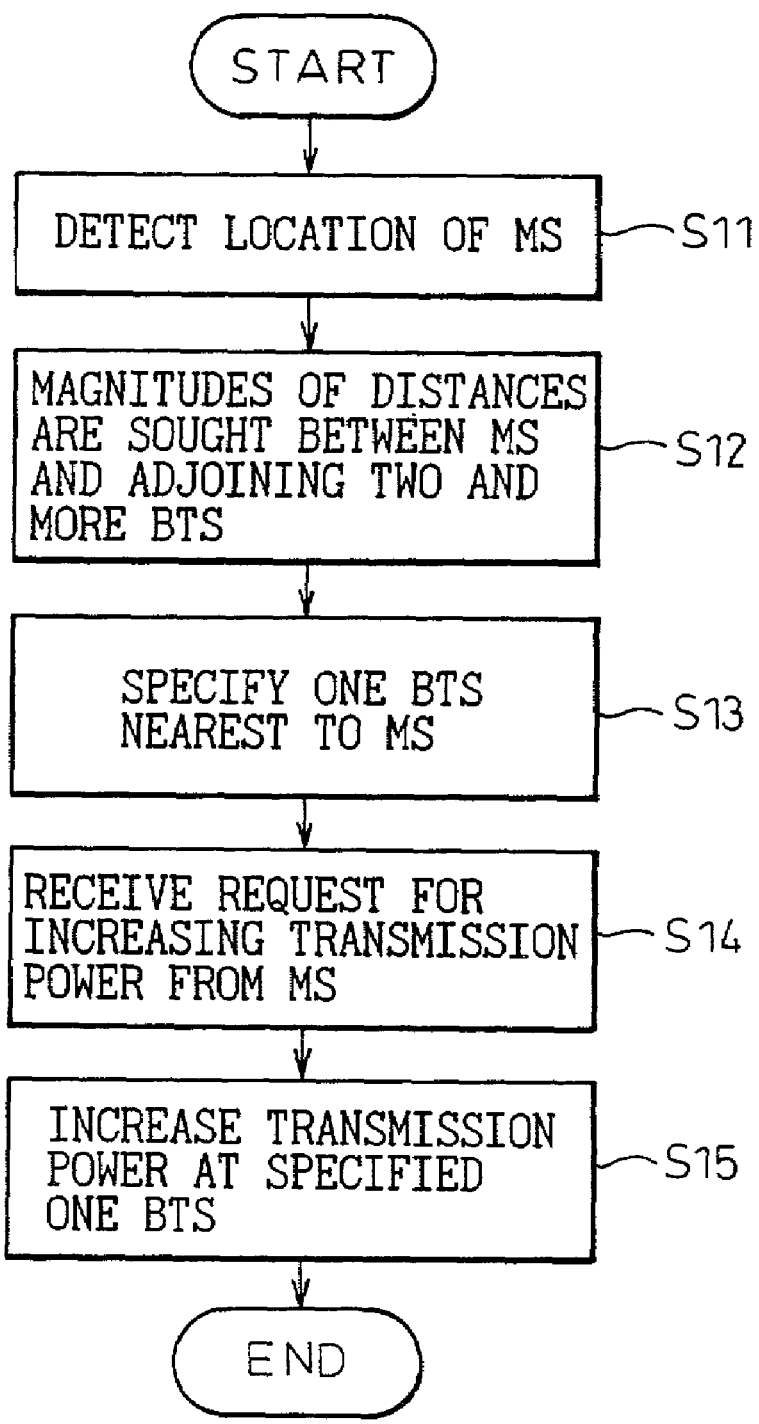
FIG. 2 is a view of the basic steps of a method for controlling downlink transmission power according to the present invention.

FIG. 1 shows the technical concept of the present invention by hardware, but this may also be expressed as steps of a method as shown in FIG. 2.

FIG. 2 is a view of the basic steps of a method for controlling the downlink transmission power according to the present invention.

This method is a method for controlling the downlink transmission power for controlling the transmission power from the base transceiver stations 2 to the mobile station 3 in a mobile communications system 1 having at least a mobile station 3 and a plurality of base transceiver stations 2 and includes the illustrated steps S11 to S15.

Step S11: Detecting the location of the mobile station (specifying and detecting the location of the mobile station by receiving location information of the mobile station sent from the mobile station or by receiving a signal from the mobile station at a plurality of base transceiver stations)

Step S12: Finding the relative magnitudes of the distances between the mobile station and at least two adjoining base transceiver stations. Note that the "at least two adjoining base transceiver stations" indicate the base transceiver station in communication with the mobile station and at least one base transceiver station adjoining that base transceiver station not at the time of handoff or at least two adjoining base transceiver stations specified as base transceiver stations for transmitting the same data to the mobile station at the time of handoff.

That is, the relative magnitudes of the distances between the location information of the mobile station detected at step S11 and the at least two adjoining base transceiver stations are calculated for example as follows. That is, if the positional coordinates of the mobile station based on a predetermined point are (x,y) and the positional coordinates of the at least two adjoining base transceiver stations (here for simplification there being considered to be two base transceiver stations) are (X1, Y1) and (X2, Y2), $$(x-X1)^2+(y-Y1)^2$$

and $$(x-X2)^2+(y-Y2)^2$$

are calculated and the one with the smaller value is determined as the smaller distance and the one with the larger value is determined as the larger distance.

Step S13: Specifying the base transceiver station with the smallest distance from the above relative magnitudes (preferably further specifying the base transceiver station with the largest distance).

Note that instead of the above steps S11 to S13, the steps of either the following Sa and Sb may also be used:

Step Sa: Receiving a signal from the mobile station at a plurality of adjoining base transceiver stations and specifying the base transceiver station with the largest received field strength (further specifying the base transceiver station with the smallest strength).

Step Sb: Having the mobile station measure the field strengths of the signals received from a plurality of base transceiver stations and transmit the field strength information to the base transceiver station in communication with the mobile station, while having the base transceiver station side facilities specify the base transceiver station with the largest received field strength based on that field strength information (and further specify the base transceiver station having the smallest strength). Note that the mobile station need not transmit the information on the field strengths themselves and may transmit information identifying the base transceiver stations in the order of the magnitude of the received field strength as information (received field strength information in the broad sense).

Step S14: Receiving a request for increasing the transmission power from the mobile station at the time of handoff.

Step S15: Raising the transmission power of the signal transmitted to the mobile station at the single base transceiver station specified as the base transceiver station having the smallest distance or the base transceiver station having the largest received field strength. Note that the transmission power is not raised for any of the other adjoining base transceiver stations. Alternatively, the transmission power is not raised for at least one other adjoining base transceiver station. As a candidate for this at least one other adjoining base transceiver station, the base transceiver station having the largest distance from the mobile station or the base transceiver station having the smallest received field strength may be mentioned.

The common concept in the configuration of FIG. 1 and the steps of FIG. 2 lies in the following point. That is, when the mobile station 3 are in the middle of handover and requests an increase of the downlink transmission power to a plurality of base transceiver stations 2 engaged in handover, it is considered that the greatest effect is obtained if increasing the downlink transmission power from the nearest base transceiver station 2 nearest to the mobile station 3 (where the distance is smallest or the received field strength is largest). That is, raising only the transmission power from the base transceiver station nearest to the mobile station is considered to result in the least interference with other mobile station and to be effective in improving the SIR. At this time, all or at least one or the other base transceiver stations in the middle of handover other than the nearest base transceiver station are maintained at their current transmission powers. Therefore, the problem mentioned above can be solved.

This will be explained in further detail below.

Figure 3:
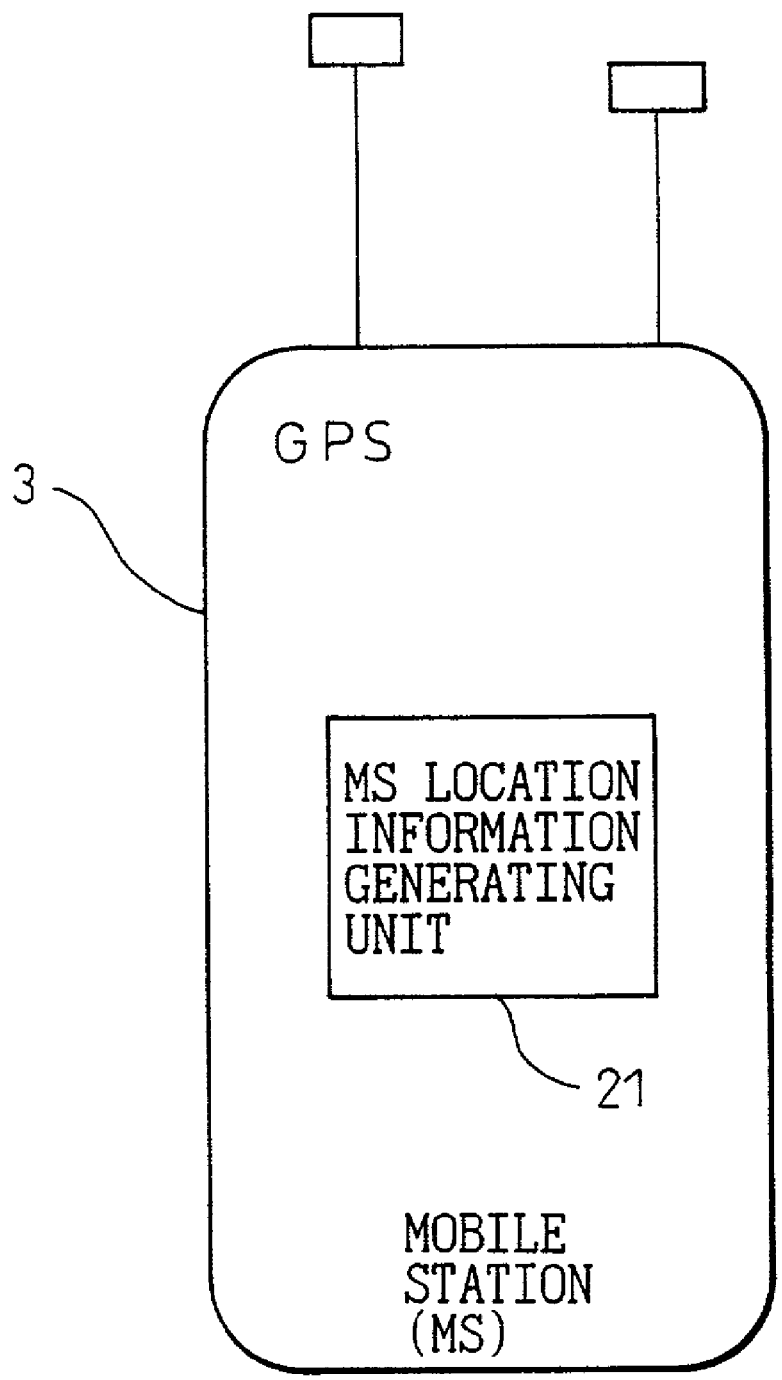
FIG. 3 is a view of just the main components of a mobile station according to the present invention.

FIG. 3 is a view showing only the main component of the mobile station according to the present invention.

The main component is the mobile station location information generating means 21.

The mobile station location information generating means 21 generates mobile station location information showing the present location of the mobile station and transmits it to one of the plurality of base transceiver stations 2 including at least the base transceiver station in communication with the mobile station.

Note that the mobile station location information is transmitted to the base transceiver station in communication with the mobile station when the quality of the signal received from the base transceiver station in communication with the mobile station falls below a predetermined quality. That is, the mobile station location information generating unit 21 is provided with a quality decision function for detecting the quality of the signal received from at least the base transceiver station in communication with the mobile station, comparing this with a predetermined quality, and deciding if that quality has fallen below that predetermined quality. For example, when the quality (for example, received field strength) of a signal received from a base transceiver station in communication with it is below a predetermined quality (for example, level), which is a condition for transmission of a signal reporting the received field strengths of signals received from the base transceiver station in communication with it and another base transceiver station adjoining that base transceiver station and triggering the conditional start of handover, the mobile station transmits the location information thereof measured by itself to the base transceiver station in communication with it. Alternatively, this is when a quality above that predetermined quality (for example, a level of that level plus a predetermined level) is not reached.

Note that the location of the mobile station is preferably measured when the quality of the signal received from the base transceiver station in communication with it falls below a predetermined quality (detected by quality decision function), but it may also be measured periodically (by providing a clock function for counting a predetermined time interval using a counter etc. and measuring the location at a timing given by that clock function). Note that during handover, the location is preferably measured periodically (similarly using the clock function). Further, after the end of handover (after the transmission of the same data from a plurality of base transceiver stations to one mobile station ends), it is preferably again to measure it periodically (similarly using the clock function) or measure it only when the quality of the signal received from the base transceiver station in communication with the mobile station falls below a predetermined quality (similarly using the clock function). On the other hand, for transmission of the location information as well, the measured location information is preferably transmitted periodically during handover (similarly using the clock function) or transmitted in accordance with a change of the location of the mobile station such as when detecting movement by a predetermined distance based on the measured position (by providing the mobile station location information generating means with a movement distance computing function for finding by computation that a distance between the location measured at a certain point of time and a position measured later exceeds a predetermined distance and transmitting the information when detecting that the predetermined distance has been exceeded by the computation) or when the mobile station has moved by a predetermined distance in a predetermined time (by providing the mobile station location information generating means with a movement speed computing function for finding by computation the distance of movement of the mobile station per unit time based on the positions measured at different points of time and detecting when the distance of movement per unit time exceeds a predetermined distance and transmitting the information when detecting that the movement exceeds the predetermined distance). Further, after the end of handover (after transmission of the same data from a plurality of base transceiver stations to a single mobile station ends), the information is preferably periodically transmitted (similarly using the clock function) or transmitted only when the quality of the signal received from the base transceiver station in communication with the mobile station falls below a predetermined quality (similarly using the quality decision function).

Figure 4:
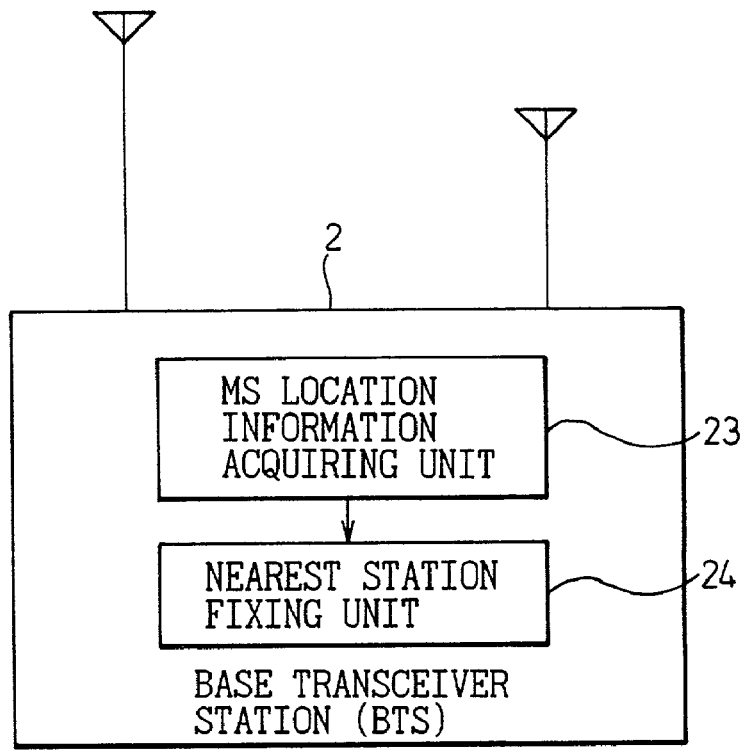
FIG. 4 is a view of just the main components of a mobile station according to the present invention.

FIG. 4 is a view of the main components of the base transceiver station according to the present invention.

The main components are the mobile station location information acquiring unit 23 and the nearest station fixing unit 24. A base transceiver station (A) 2 including these operates according to the present invention when in the middle of handover with the mobile station 3 and receiving a request for raising the transmission power from the mobile station 3. That is, the mobile station location information acquiring unit 23 acquires the mobile station location information from the mobile station 3 and the location information of that base transceiver station (A) 2 and the adjoining base transceiver stations (B, C) 2. Further, the nearest station fixing unit 24 determines if that base transceiver station is nearest to the mobile station 3 using the mobile station location information and the location information of the base transceiver stations.

When the base transceiver station (A) is determined to be nearest to the mobile station 3, the transmission power control unit operates to raise the transmission power of the signal transmitted to the mobile station in accordance with the request for increasing the transmission power.

Note that the transmission power control unit preferably operates by providing the base transceiver station with a handoff detection function for determining if the mobile station is in the middle of handoff and when determining that it is in the middle of handoff by the handoff detection function.

Further, the location information of a base transceiver station may be obtained from the later explained base transceiver station host equipment or may be obtained by storing and reading out from a memory, mounted in the station, the location information of the base transceiver station including other adjoining base transceiver stations.

Further, a base transceiver station may be determined to be the base transceiver station nearest to the mobile station by a notification from the later explained base transceiver station host equipment (nearest notification). At that time, it is also possible to provide, instead of the illustrated location information acquiring unit 23 and nearest station fixing unit 24, the base transceiver station 2 with a means for receiving the notification (nearest notification) from the base transceiver station host equipment and have it operate to raise the transmission power of the signal transmitted to the mobile station in accordance with a request for raising the transmission power when receiving that notification by the notification receiving means. Further, it is also possible to provide a farthest station fixing unit instead of the nearest station fixing unit 24 and not raise the transmission power only when a station is judged to be the base transceiver station farthest from the mobile station. Note that when not providing the farthest station fixing unit at the base transceiver station, but providing it at the base transceiver station host equipment 4 and providing the base transceiver station host equipment 4 with a farthest notifying unit for notifying a specified base transceiver station that it is the farthest base transceiver station and when that base transceiver station receives the notification, control is performed not to raise the transmission power.

Further, it is also possible to provide each base transceiver station with a field strength measuring unit for measuring the field strength of the signal received from the mobile station instead of the mobile station location information acquiring unit 23 and the nearest station fixing unit 24 and to provide each base transceiver station with a field strength transmitting unit for transmitting the received field strength information regarding the same mobile station to other base transceiver stations and a field strength deciding unit for receiving the field strengths transmitted from the field strength transmitting units, comparing them with its own field strength, and deciding if its own field strength is the largest among those of the other base transceiver stations. Further, the field strength deciding unit may be provided with a function of deciding if the field strength at that base transceiver station is the smallest among those of the other base transceiver stations.

Figure 5:
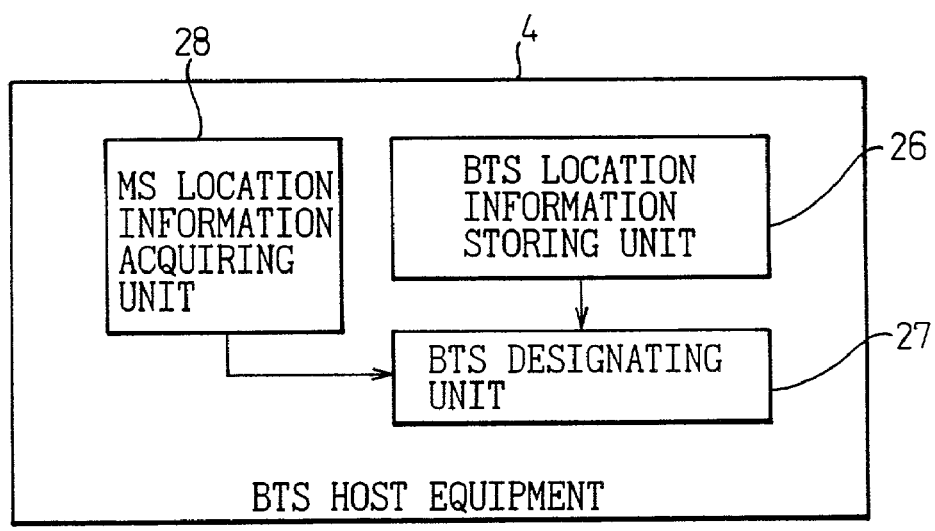
FIG. 5 is a view of just the main components of a base transceiver station host equipment according to the present invention.

FIG. 5 is a view of only the main components of the base transceiver station host equipment according to the present invention.

The main components are the base transceiver station location information storing unit 26 and the base transceiver station designating unit 27. The base transceiver station host equipment 4 including these is provided with the function of controlling a plurality of adjoining base transceiver stations 2 to transmit the same data to the mobile station 3. Here, the base transceiver station location information storing unit 26 stores the location information relating to the locations of the plurality of adjoining base transceiver stations 2. The mobile station location information acquiring unit 28 receives and acquires location information of the mobile station transmitted from the mobile station through the base transceiver stations. Alternatively, it has the plurality of base transceiver stations receive the signal from the mobile station and evaluate it to measure the location of the mobile station and obtain the location information.

Further, the base transceiver station designating unit 27 decides on the single base transceiver station nearest to the mobile station among the base transceiver stations involved in the handover based on the mobile station location information and the base transceiver station location information before the start of handover, at the start, or during handover.

Further, it notifies the decided base transceiver station to respond to the request for raising the transmission power.

Note that it is possible to provide each base transceiver station with a memory for storing the location information of the base transceiver station, have the base transceiver station host equipment transmit the request for site location information to each base transceiver station, and have each base transceiver station read its own location information from the memory and transmit it to the base transceiver station host equipment in order that the base transceiver station host equipment obtains the base transceiver station location information.

Further, it is also possible to provide, instead of the location information storing unit 26 and the base transceiver station designating unit 27, a received field collecting means for receiving from each base transceiver station received field strength information in a plurality of base transceiver station receiving a signal from the mobile station, to specify the base transceiver station having the largest magnitude of the received field strength in the base transceiver stations collected by the received field collecting means as the base transceiver station nearest to the mobile station, to specify the base transceiver station having the smallest magnitude of the received field strength as the base transceiver station farthest from the mobile station, and to provide a decision result notifying means for transmitting the results of the decisions to the specified base transceiver stations.

Next, a detailed example of one example of each of the mobile station 3, base transceiver station 2, and base transceiver station host equipment 4 will be explained.

Figure 6:
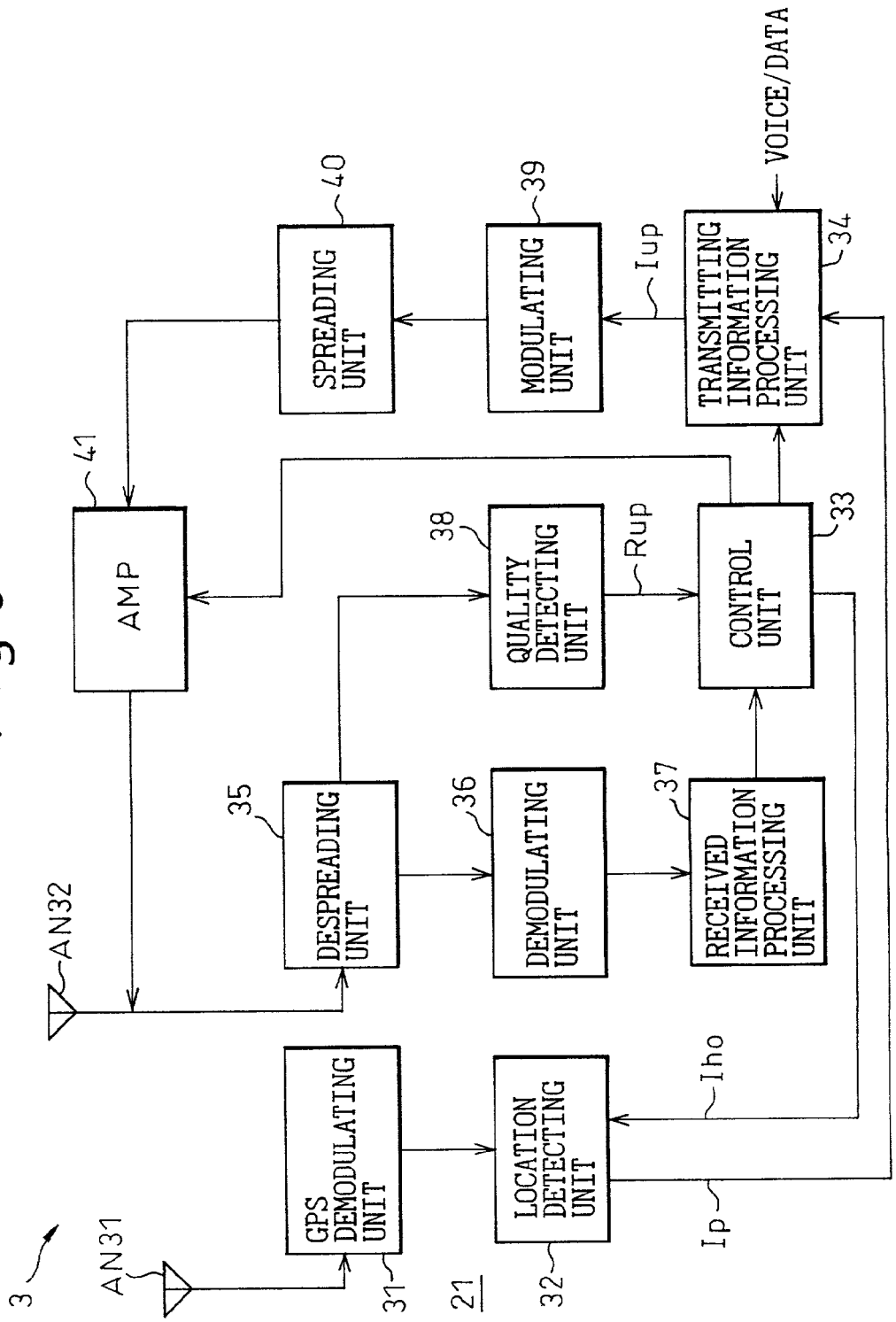
FIG. 6 is a view of a detailed example of a mobile station according to the present invention.

FIG. 6 is a view of a detailed example of a mobile station according to the present invention.

In the figure, the portions relating to the mobile station location information generating unit 21 shown in FIG. 3 are first a GPS demodulating unit 31 and a location detecting unit 32. Further, there are the control unit 33 for notifying the location detecting unit 32 that it should output location information (for example, notification at the time of communication or time of noncommunication or periodically or in accordance with a timing for transmission of existing notification messages triggering the start of handover) and a transmitting information processing unit 34 for transmitting the output location information to the base transceiver stations. Here the mobile station information generating unit 21 has a GPS location detection apparatus (31, 32, etc.) mounted in the mobile station 3.

Note that there are mobile stations which originally are provided with the above GPS demodulating unit 31 and location detecting unit 32. Such a purpose of use, however, is not relevant to the present invention.

A GPS signal received from a GPS antenna AN31 is demodulated by the GPS demodulating unit 31 so as to reproduce the original GPS data. The reproduced GPS data is input to the location detecting unit 32 where predetermined computations are performed, then the location information Ip is output as latitude/longitude information.

The obtained location information Ip is transmitted through the transmitted information processing unit 34 from the mobile antenna AN32.

Note that in this embodiment, the case of use of the GPS position detection apparatus was shown, but it is also possible to replace this by another location measuring function which uses the phase difference etc. of the signals received from the plurality of base transceiver stations to detect the location of the mobile station at the mobile station. Further, it is also possible not to provide the location measuring function at the mobile station, but to apply the method of measurement using the phase difference and field strengths of the signals received from the mobile station at the plurality of base transceiver stations to measure the location of the mobile station. In this case, however, it is necessary to provide a field strength measuring unit for the mobile station for such measurement at the base transceiver station side facilities.

In the figure, the other components 35 to 41 are already known in general mobile stations. They are briefly as follows:

The received signal from the mobile antenna AN32 spread over a broad band by the dispersal code is despread by the despreading unit 35, then input to the demodulating unit 36 and quality detecting unit 38.

The signal input to the demodulating unit 36 is demodulated there and reproduced to the original signal. Further, the received information processing unit 37 extracts the control signal (including the transmission power information) from the signal and passes it on to the above control unit 33.

The mobile station controls the increase/decrease of the uplink transmission power to a base transceiver station 2 in accordance with the transmission power control information from the base transceiver station 2 in communication with it. That is, the information is input to the control unit 33. The control unit 33 raises/lowers the gain of an amplifier (AMP) 41. The control of the uplink transmission power spoken of here, however, is not related to the present invention. The present invention relates to the control of downlink transmission power from a base transceiver station 2 to the mobile station 3.

On the other hand, the received signal input from the despreading unit 35 to the quality detecting unit 38 is inspected for the quality of signal here. For example, the previously mentioned SIR is measured. The control unit 33 compares the quality from the quality detecting unit (here, the SIR) and the set quality (SIR) (here, compares the relative magnitudes).

Of particular relevance to the present invention is the case where the above comparison of the relative magnitudes show the measured SIR is below the set SIR (measured SIR<target SIR). The transmitting information processing unit 34 of the request Rup to the base transceiver station to the effect that it should raise the transmission power. A transmitting information processing unit 34 receiving this sends transmitted information including the request (Iup) for raising the transmission power to the modulating unit 39.

Note that the above location information Ip may also be transmitted at the time of transmission of Iup as a pair with Iup.

Further, the mobile station location information (Ip) showing its own (mobile station) present location can also be transmitted to the base transceiver station 2 side in an existing communication message triggering the start of handover from the base transceiver station side facilities.

Figure 7:
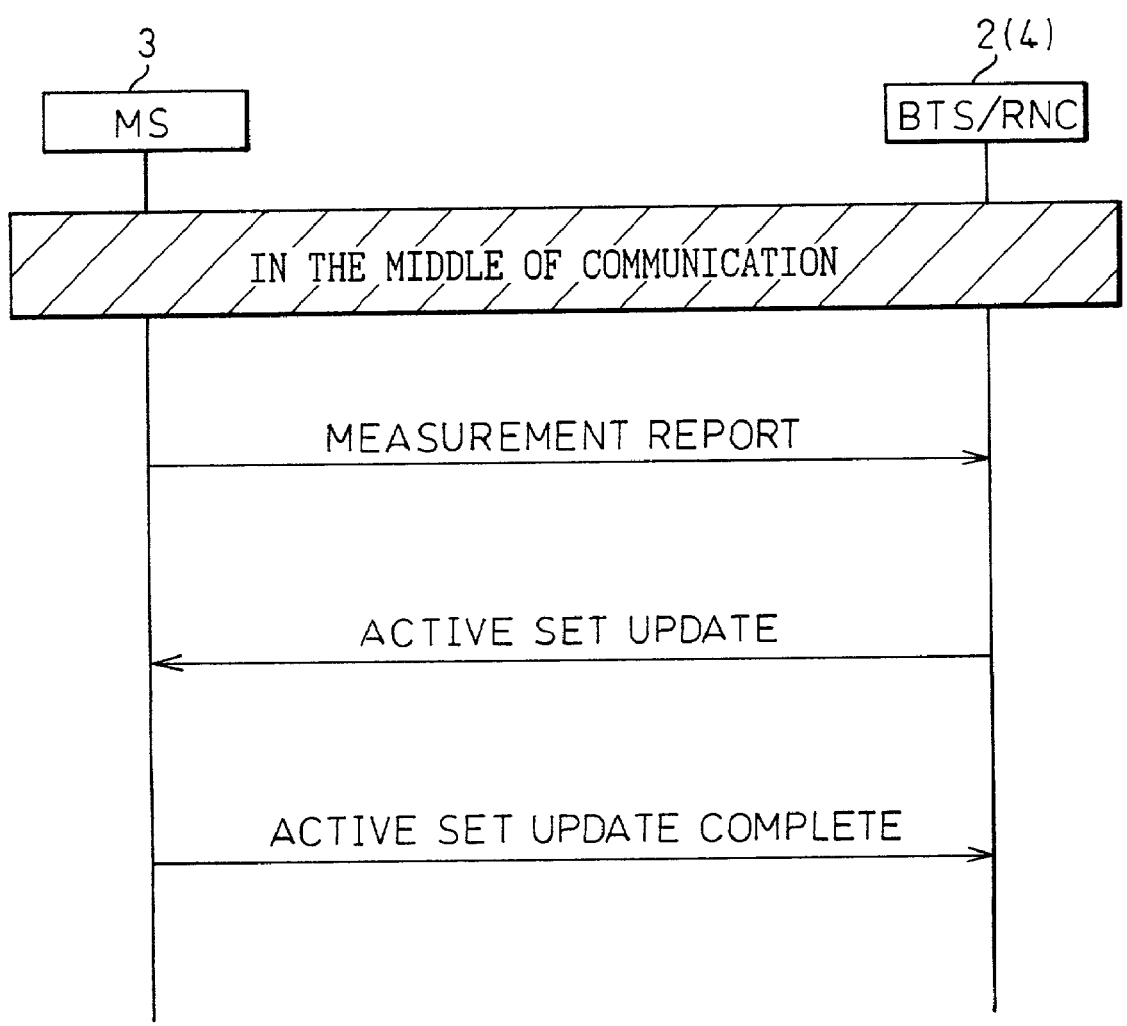
FIG. 7 is a known sequence diagram at the time of handover.

FIG. 7 is a known sequence diagram of handover and is based on the 3GPP (Third Generation Partnership Project) standard.

The figure shows the sequence between the mobile station (MS) 3 and a base transceiver station side facility (BTS, RNC etc.) including a base transceiver station (BTS) 2. RNC is a radio network controller, that is, the base transceiver station control apparatus.

When the mobile station 3 enters a communicating state ("in the middle of communication"), the measurement of the field strength etc. of the signal received from the base transceiver station triggering soft handover designated by the RNC (level of signal received from base transceiver station in the middle of communication and surrounding base transceiver stations etc.) is started. When the measured level satisfies the report criteria, that is, when the soft handover conditions are satisfied, the mobile station 3 transmits the illustrated measurement report message (including information on results of measurement) to the base transceiver station host equipment 4 side. The base transceiver station host equipment side receives this message and thereby starts the soft handover processing (3GPP standard).

In the present embodiment, the mobile station location information (Ip) detected at the mobile station gives information elements for reporting the location information to the measurement report message and is transmitted from the mobile station to the base transceiver station as part of the measurement report message.

Note that the mobile station location information transmitted by the mobile station may be measured during communication, during noncommunication, or periodically, but preferably the mobile station is provided with a measurement control unit for controlling measurement of the location of the mobile station, to be performed only when the results of measurement relating to handover (level of signal received from base transceiver station) satisfies the report criteria (when level of signal received from base transceiver station in communication falls below a predetermined threshold), under certain timing conditions.

Note that after the handover has started, it is preferable to send the location information (Ip) periodically or when the mobile station has moved by a predetermined distance according to measurement of the location of the mobile station using GPS etc.

Therefore, as explained above, it is possible to include the mobile station location information in an existing notification message and transmit it to the base transceiver station 2 side.

Figure 8:
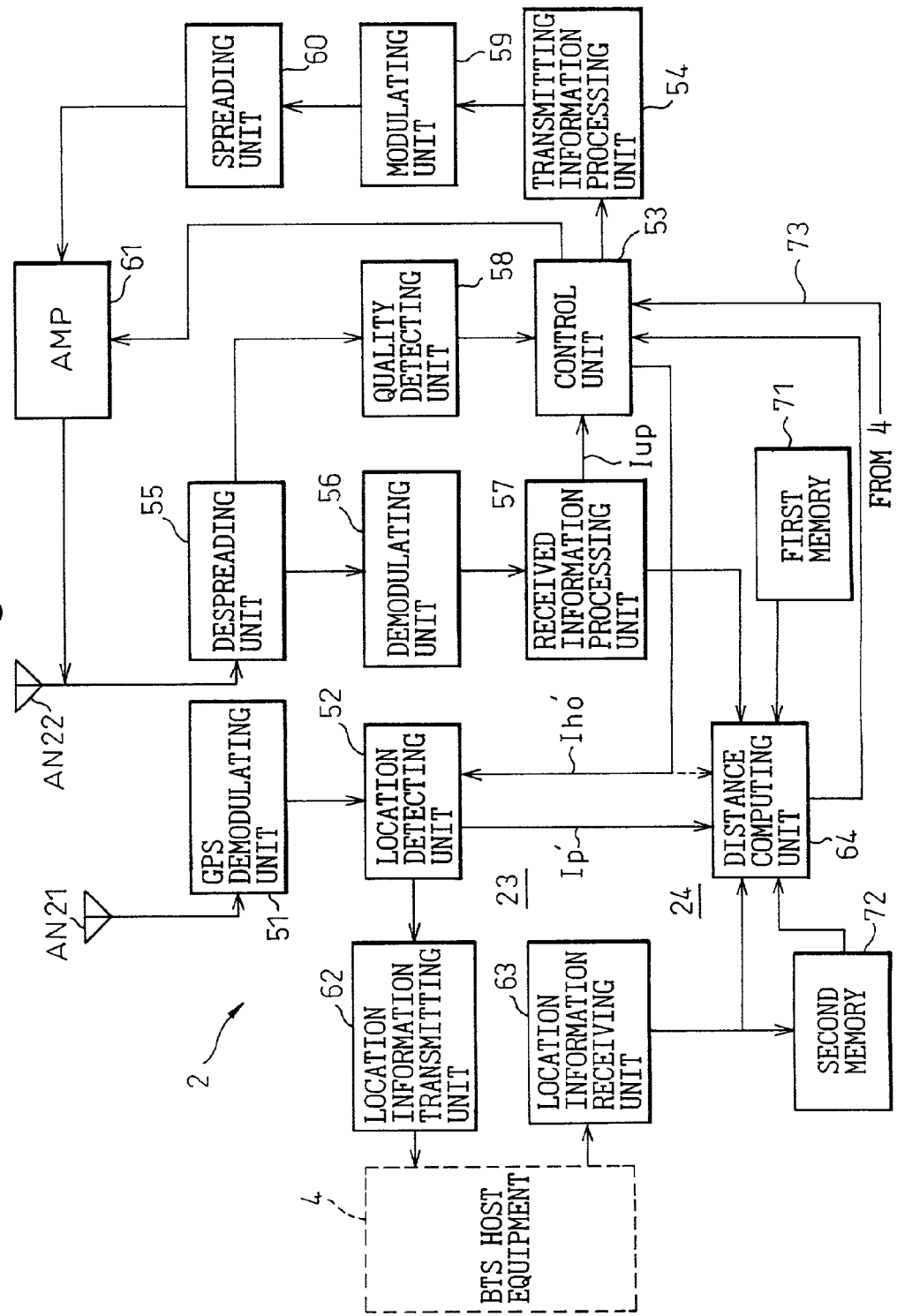
FIG. 8 is a view of a detailed example of a base transceiver station according to the present invention.

FIG. 8 is a view of a detailed example of the base transceiver station according to the present invention.

In the figure, the basic configuration of the base transceiver station 2 is similar to the basic configuration of the mobile station 3 shown in FIG. 6. The components 51, 52, 53 . . . 59, 60, and 61 in FIG. 8 correspond functionally to the components 31, 32, 33 . . . 39, 40, and 41 explained in FIG. 6. Therefore, explanations of the corresponding components (51 to 61) will be omitted.

First, the portions relating to the location information acquiring unit 23 shown in FIG. 4 are the GPS demodulating unit 51 and the location detecting unit 52 for the base transceiver station 2 to acquire its own location information. Further, there is the location information receiving unit 63 for the base transceiver station (A) 2 to acquire the location information of the other nearby base transceiver stations (B, C) 2.

Therefore, as a first example of the location information acquiring unit 23, it is necessary to have a GPS location detection apparatus (51, 52, AN21, etc.) mounted in at least itself (base transceiver station). The location information receiving unit 63 is required for acquiring the location information of the other nearby base transceiver stations from the base transceiver station host apparatus 4.

If the base transceiver station 2 in communication with the mobile station is the base transceiver station A, the other base transceiver station B has to acquire the location information of the base transceiver stations A and C, while the base transceiver station C has to acquire the location information of the base transceiver stations A and B. Therefore, the base transceiver station A notifies its own location information to the host side through the location information transmitting unit 62. The base transceiver stations B and C also notify their location information to the host side through similar location information transmitting units. The location information is exchanged between base transceiver stations at the start of handover or periodically or when a certain distance is moved when the location of the base transceiver station changes.

In this way, the location information acquiring unit 23 of the base transceiver station A acquires its own station's location information and the location information of the other nearby base transceiver stations (B, C).

The base transceiver station B acquires the location information of the base transceiver stations A and C, while the base transceiver station C acquires the location information of the base transceiver stations A and B. Note that it is also possible to store the location information of the adjoining base transceiver stations at each base transceiver station. That is, the location information of the base transceiver stations A, B, and C are stored in advance in the memory in the base transceiver stations A, B, and C.

Therefore, the location information of all of the base transceiver station and the mobile station engaged in handover is collected by the location information acquiring unit 23 and input to the nearest station fixing unit 24 shown in FIG. 4. Further, the mobile station location information acquiring unit 23 of the base transceiver station A in communication with the mobile station 3 receives the mobile station location information (Ip) contained in the signal received from the mobile station (for example, the measurement report message) and gives that location information to the nearest station fixing unit 24. Note that the base transceiver stations B and C may directly receive the mobile station location information from the mobile station 3 if able to directly receive it and give that location information to the nearest station fixing unit. If not able to directly receive it, they may obtain the mobile station location information through the base transceiver station A in communication with it and give the location information to the nearest station fixing unit 24. In FIG. 8, the nearest station fixing unit 24 is shown as a distance calculating unit 64. That is, the distances between the mobile station 3 and the base transceiver stations A, B, and C are evaluated by the nearest station fixing unit 24. The single base transceiver station having the smallest value is for example determined as the base transceiver station A. The decided information is transferred to the control unit 53.

Due to this, at the base transceiver stations B and C, the gains of their amplifiers (corresponding to 61 in FIG. 8) are maintained as they are, while at the base transceiver station A of FIG. 8, the gain of the amplifier 61 is raised by the control of the control unit (transmission power) 53.

In this way, the above nearest station fixing unit 24 determining the base transceiver station located nearest the mobile station 3 functions to find by computation the single base transceiver station of the relative nearest distance between the mobile station and the base transceiver stations based on the location information of the mobile station 3 and the base transceiver stations 2 engaged in the handover. Therefore, it is not necessarily required to find the absolute values of the distances.

The above-mentioned location information acquiring unit 23 is a first example of the same. Next, a second example will be explained.

The location information acquiring unit 23 of the second example has a first memory 71 for holding as fixed data in advance the location of itself (A) and the locations of other base transceiver stations (B, C).

Therefore, in this case, the components AN21, 51, 52, 62, and 63 of FIG. 8 are unnecessary. Only the distance calculating unit 64 activated by the handover information Iho' is necessary.

The second example is effective when all base transceiver stations are completely fixed and never change in location.

Further, a third example of the location information acquiring unit 23 will be explained.

The location information acquiring unit 23 of the third example has a second memory for receiving and storing from the base transceiver station host equipment 4 the location information held by the base transceiver station host equipment 4.

Therefore, in this case, the components AN21, 51, 52, 63, and 71 of FIG. 8 are unnecessary. A distance calculating unit 64 activated by the handover information Iho' is necessary. Further, a location information transmitting unit 62 for notifying its own location information to the higher base transceiver station host equipment 4 is also necessary.

The third example is effective when the base transceiver stations are equipped with GPS and the location information of each station is obtained using the same.

According to the various aspects explained with reference to FIG. 8, the basic configuration comprises acquiring the location information in a base transceiver station 2 and deciding in the base transceiver station 2 whether it is nearest to the mobile station 3.

Developing this further, however, it is possible to configure a base transceiver station 2 in the following way.

The base transceiver station 2 may be configured to receive a notification to the effect that it has been judged by the base transceiver station host equipment to be nearest to the mobile station based on the location information of the mobile station 3 acquired from the base transceiver station 2, that is, the Ip information, and the location information of the base transceiver stations in the middle of handover with the mobile station (information stored in advance in the base transceiver stations or acquired from the base transceiver stations) and to increase the transmission power to the mobile station through the control unit 53 when in the middle of handover with the mobile station 3 and receiving a request (Iup) for increasing the transmission power from the mobile station 3.

According to this configuration, it is necessary to provide a control line 73 for receiving the above notification from the base transceiver station host equipment 4 in FIG. 8, but the components AN21, 51, 52, 63, and 64 of FIG. 8 are not required at all and the configuration of existing base transceiver stations 2 does not have to be modified at all.

The base transceiver station host equipment 4, however, for example, the base transceiver station control apparatus (RNC), has to be modified. Due to this modification, the components added to the existing RNC (4) are the location information storing unit 26 and the base transceiver station designating unit 27 shown in FIG. 4.

Figure 9:
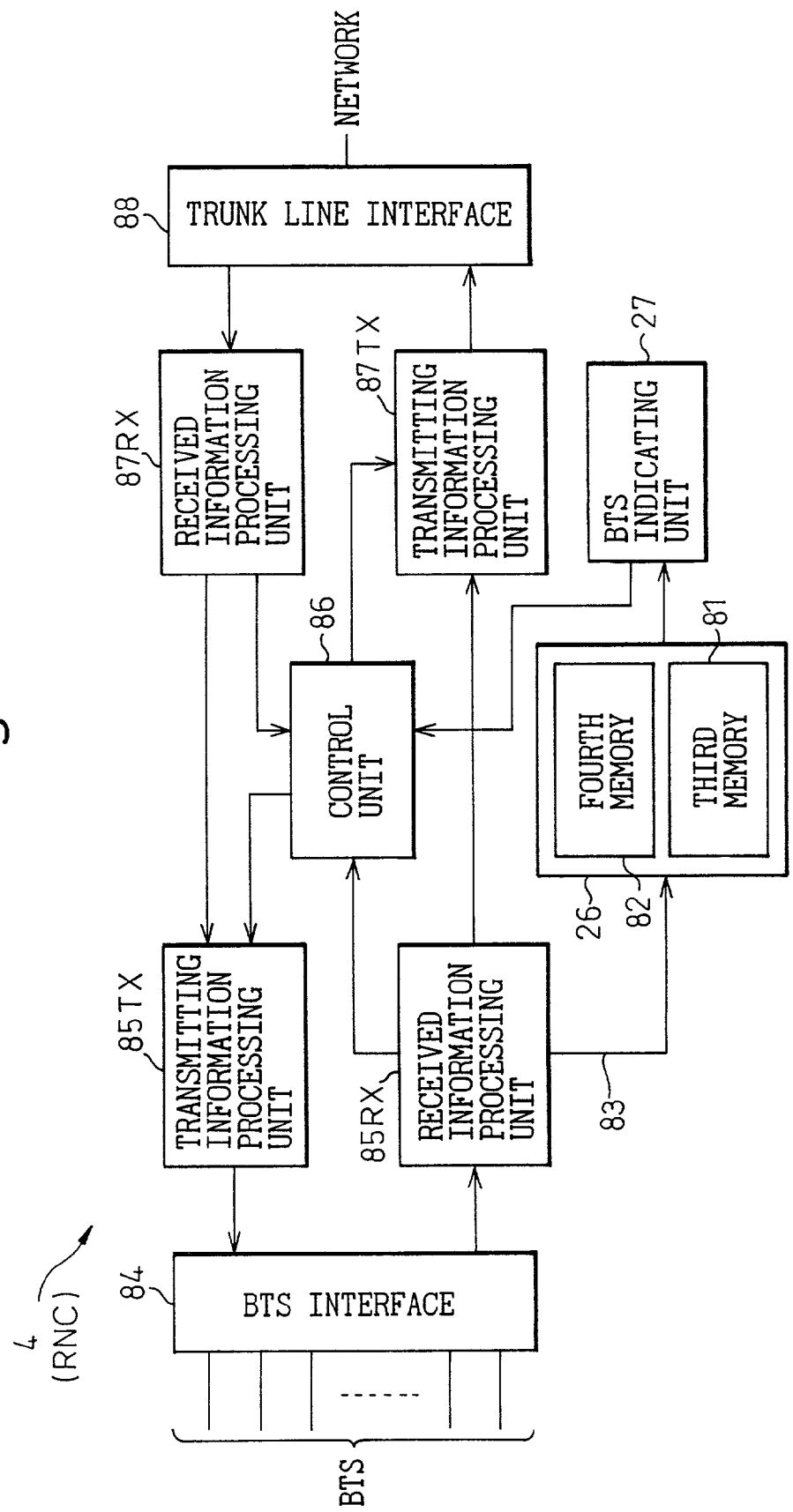
FIG. 9 is a view of a detailed example of a base transceiver station host equipment according to the present invention.

FIG. 9 is a view of a detailed example of the base transceiver station host equipment according to the present invention.

Note that the base transceiver station host equipment 4 of the figure is a base transceiver station control apparatus (RNC). In the figure, in a first aspect, the location information storing unit 26 has a third memory 81 which collects and holds location information transmitted from the plurality of base transceiver stations 2 and location information from the mobile station transferred through the base transceiver stations 2. In this case, the fourth memory 82 is not necessary.

On the other hand, in a second aspect, the location information storing unit 26 has a fourth memory 82 for holding as fixed data in advance the location information of the plurality of base transceiver stations 2 and collecting and holding location information of the mobile station transferred from the mobile station 3 through the base transceiver stations 2. In this case, the third memory 81 is not necessary.

Both the third memory 81 and the fourth memory 82, however, hold the table of the later explained FIG. 10.

The content of the table in the location information storing unit 26 is referred to by the base transceiver station designating unit 27. The base transceiver station designating unit 27 has the function of finding by computation the single base transceiver station with the nearest relative distance between the mobile station 3 and the base transceiver stations 2 and holds the result as a table. An example of the table is shown in the later explained FIG. 11.

In FIG. 9, the components other than the components 26, 27, 81, and 82 and the location information line 83 are general components of a base transceiver station control apparatus (RNC).

The heart of the base transceiver station control apparatus (RNC) is the control unit (CPU) 86. The control unit (controller) 86, in addition to handling the general control such as the call processing control and handover control, works with the base transceiver station designating unit 27 linked with the location information storing unit 26 to control the transmission power according to the present invention. Note that the computation for finding the one nearest base transceiver station according to the base transceiver station 27 may of course be performed by the controller 86 as well.

The controller 86 receives as input information from the received information processing unit (processor) 85RX and the received information processing unit (processor) 87RX and outputs the predetermined control information to the transmitting information processor 85TX and transmitted information processor 87TX. Among these, the received information processor 85RX works to supply the location information received from the mobile station 3 through the base transceiver stations 2 to the location information storing unit 26. This processor 85RX mainly analyzes the received information input through the base transceiver station interface 84.

The processor 85TX generates information for transmission to the base transceiver station side (including mobile station), while the processor 87TX generates information for transmission to the host station (not shown) through a station line interface 88, for example, setup information for setting up a communication path between the mobile station and the network. The processor 87RX analyzes for example the setup information to be transferred with the host station.

Figure 10:
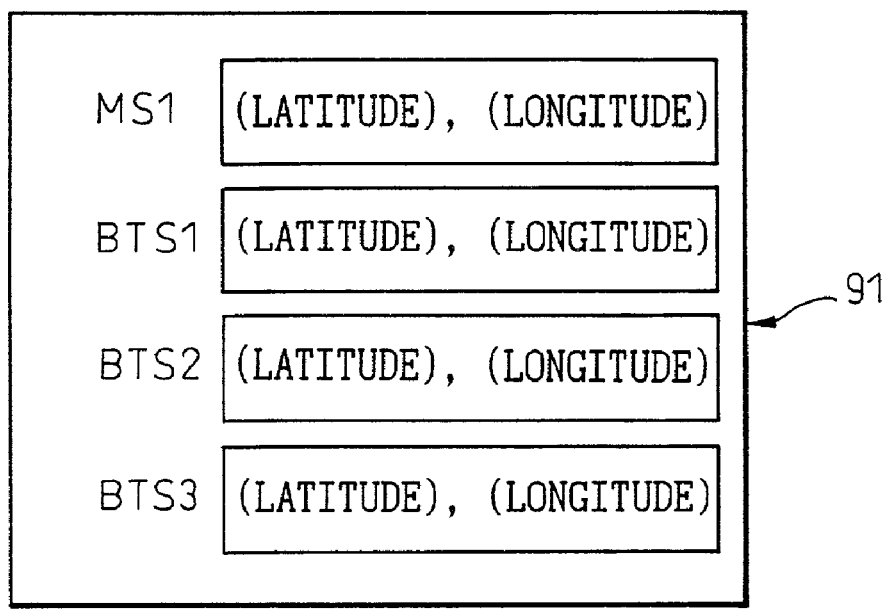
FIG. 10 is a view of an example of a table as a location information storage unit 26.

FIG. 10 is a view of an example of a table serving as the location information storing unit 26.

The figure shows a location information table 91.

The table 91 registers location information of the mobile station in the middle of communication and location information of the base transceiver station in the middle of handover with the mobile station. The table 91 registers the mobile station ID and location information of the mobile station in the middle of communication first and the base transceiver station ID and location information of its own base transceiver station second. Further, it registers the base transceiver station IDs and location information of the other base transceiver stations (B, C, etc.) which the mobile station in communication with its own base transceiver station (A) is in the middle of soft handover third and on.

The location information of the base transceiver stations is the information detected using GPS or information held as fixed data. The table 91 of this figure is that of the base transceiver station A and shows that it is currently in the middle of soft handover with the mobile station MS1 and that the mobile station MS1 is in the middle of soft handover with the base transceiver station B and base transceiver station C.

Figure 11:
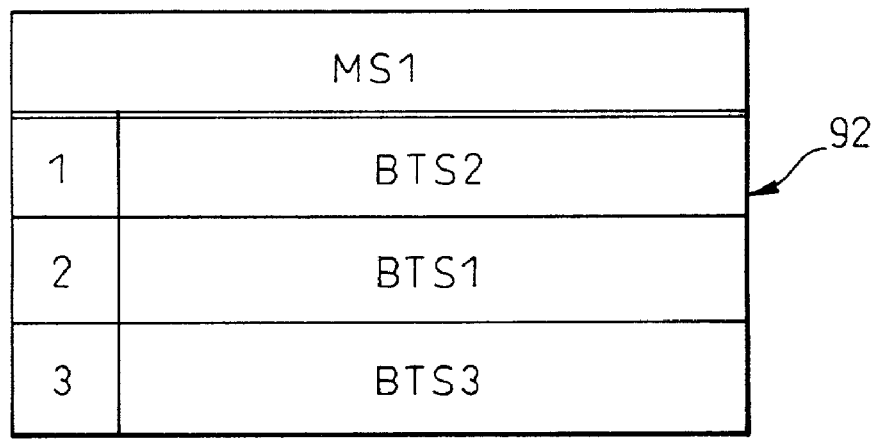
FIG. 11 is a view of an example of a table as a base transceiver station indicating unit 27.

FIG. 11 is a view of an example of a table serving as the base transceiver station designating unit 27.

The figure shows a base transceiver station designating table 92.

This table 92, (based on the calculated the distances between the mobile station and the base transceiver stations in the middle of soft handover) registers the base transceiver station IDs in the order of shortest distance. The table 92 registers the ID of the mobile station in the middle of soft handover (MS1) first and the base transceiver station IDs of the base transceiver stations in the order of nearness to the mobile station second and on (the base transceiver station ID of at least one base transceiver station including at least the nearest base transceiver station) (BTS2→BTS1→BTS3 . . . ).

The location information of the base transceiver stations used for calculation of the distances is information detected using GPS and obtained from the base transceiver stations or information held as fixed data. Alternatively, in the calculation at this time, the table 91 serving as the location information storing unit 26 may be used.

The table 92 of this figure is for the base transceiver stations A, B, and C and shows that they are currently in the middle of soft handover with the mobile station MS1, that the base transceiver station nearest to the mobile station MS1 is the base transceiver station B (BTS 2), that the next nearest one is the base transceiver station A (BTS 1), and that the next nearest one after that is the base transceiver station C (BTS 3). The table 92 is produced for each mobile station in the middle of soft handover.

Note that when the table 92 is used at the base transceiver stations, only the ID of the nearest base transceiver station need to be known. The IDs of the other base transceiver stations are not required for the table. Since the case of use of the table at the base transceiver station control apparatus (4) is being explained, however, the IDs of all base transceiver stations in the middle of handover are required in the sense of managing the base transceiver stations in the middle of handover so as to provide instructions to the base transceiver stations.

Note that the nearest base transceiver station is preferably decided each time mobile station location information (Ip) is received from the mobile station (each time the location information is changed). That is, when the mobile station moves during handover, the nearest base transceiver station also sometimes changes, so it is preferable to determine the nearest base transceiver station based on the mobile station location information from the mobile station periodically or with every updating of the mobile station location information and optimize the base transceiver station in accordance with the signal requesting an increase of the transmission power from the mobile station throughout the handover. After the end of handover, it is possible not to perform processing such as the transmission of the location information from the mobile station and determination of the nearest base transceiver station.

Finally, several aspects of the flow of processing will explained for reference.

Figure 12:
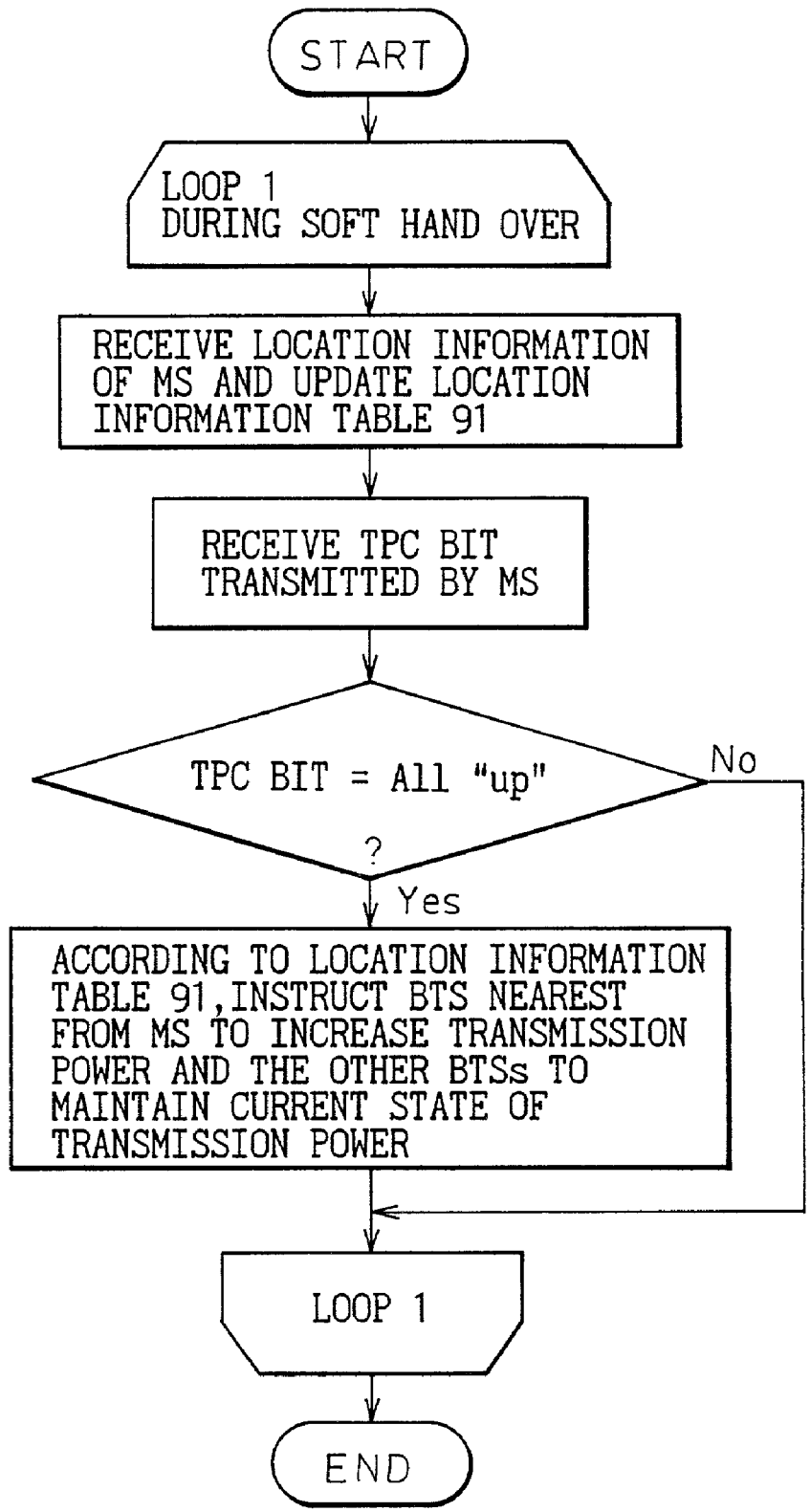
FIG. 12 is a flow chart of a first aspect of the flow of processing.

FIG. 12 is a flow chart of a first aspect of the flow of processing.

The first aspect is for the case where
(i) the base transceiver stations do not have GPS and
(ii) the location information of the base transceiver stations is held as fixed data by the base transceiver station control apparatus RNC.

In the figure, the "loop 1" shown in the first step means that the series of steps following this are repeatedly executed.

The "MS" shown in the second step means mobile station.

The "TPC" shown in the third step means the above-mentioned transmission power control information.

Further, in the third step, the base transceiver stations have to transmit the TPC bits received from the mobile station to the base transceiver station control apparatus RNC.

The fourth step decides if the TPC bits indicate "up". In this case, the TPC bits of the mobile station sent to the base transceiver stations always match, so the decision on "up" or "down" does not have to be performed for all TPC bits.

In the example of this figure, the base transceiver station control apparatus RNC has the location information of the base transceiver stations in advance, but the method of reporting what the base transceiver stations each hold may also be considered.

Further, in the example, the method is adopted of reporting the TPC bits of the mobile station from the base transceiver stations to the base transceiver station control apparatus RNC, but a method of not reporting them may also be considered. For example, it is also possible to determine the TPC bits in just the base transceiver stations as in the past and have the base transceiver station control apparatus RNC just transmit instructions on what base transceiver stations to increase the transmission power for and what base transceiver stations to hold at the current status.

Figure 13:
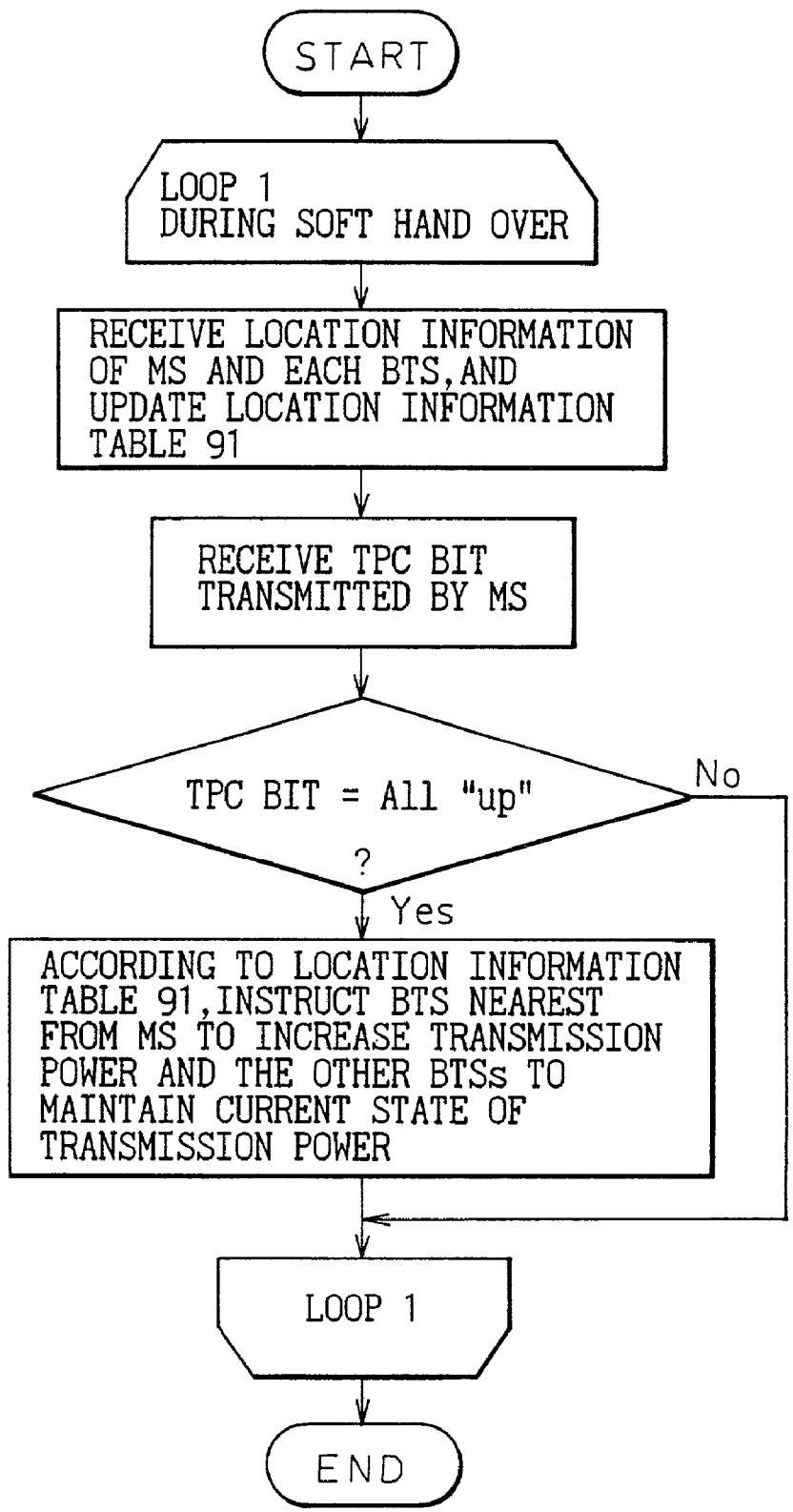
FIG. 13 is a flow chart of a second aspect of the flow of processing.

FIG. 13 is a flow chart of a second aspect of the flow of processing.

The second aspect is substantially the same as the first aspect explained above, but differs from it in that the base transceiver stations have GPS and therefore, in the second step, the location information is also received from the base transceiver stations.

Figure 14:
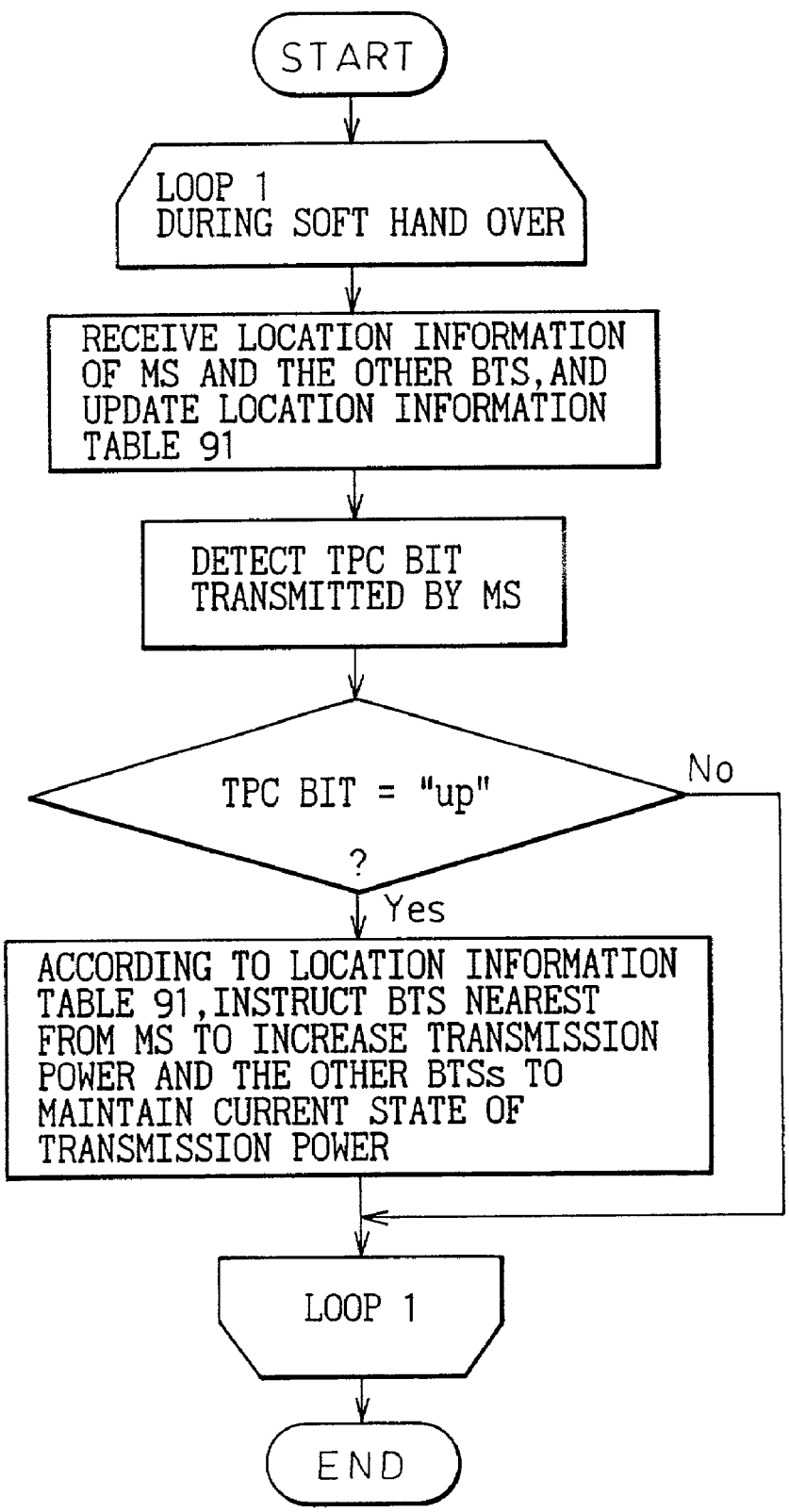
FIG. 14 is a flow chart of a third aspect of the flow of processing.

FIG. 14 is a flow chart of a third aspect of the flow of processing.

The third aspect is the case where
(i) the base transceiver stations do not have GPS and
(ii) the location information of the base transceiver stations is held as fixed data (first memory 71).

Explaining further the second step of the figure, the location information of other base transceiver stations is received through the base transceiver station control apparatus RNC.

In the example of the figure, the location information of the base transceiver stations is held in advance by the base transceiver stations and is transmitted to the base transceiver stations involved in the soft handover through the base transceiver station control apparatus RNC. In addition, various other methods may be considered such as having the base transceiver stations hold location information of the surrounding base transceiver stations in advance (at this time, the base transceiver station control apparatus RNC has to notify which base transceiver stations are in the middle of soft handover) or having the base transceiver station control apparatus RNC hold location information of the base transceiver stations and send it to the related base transceiver stations in the middle of soft handover.

Figure 15:
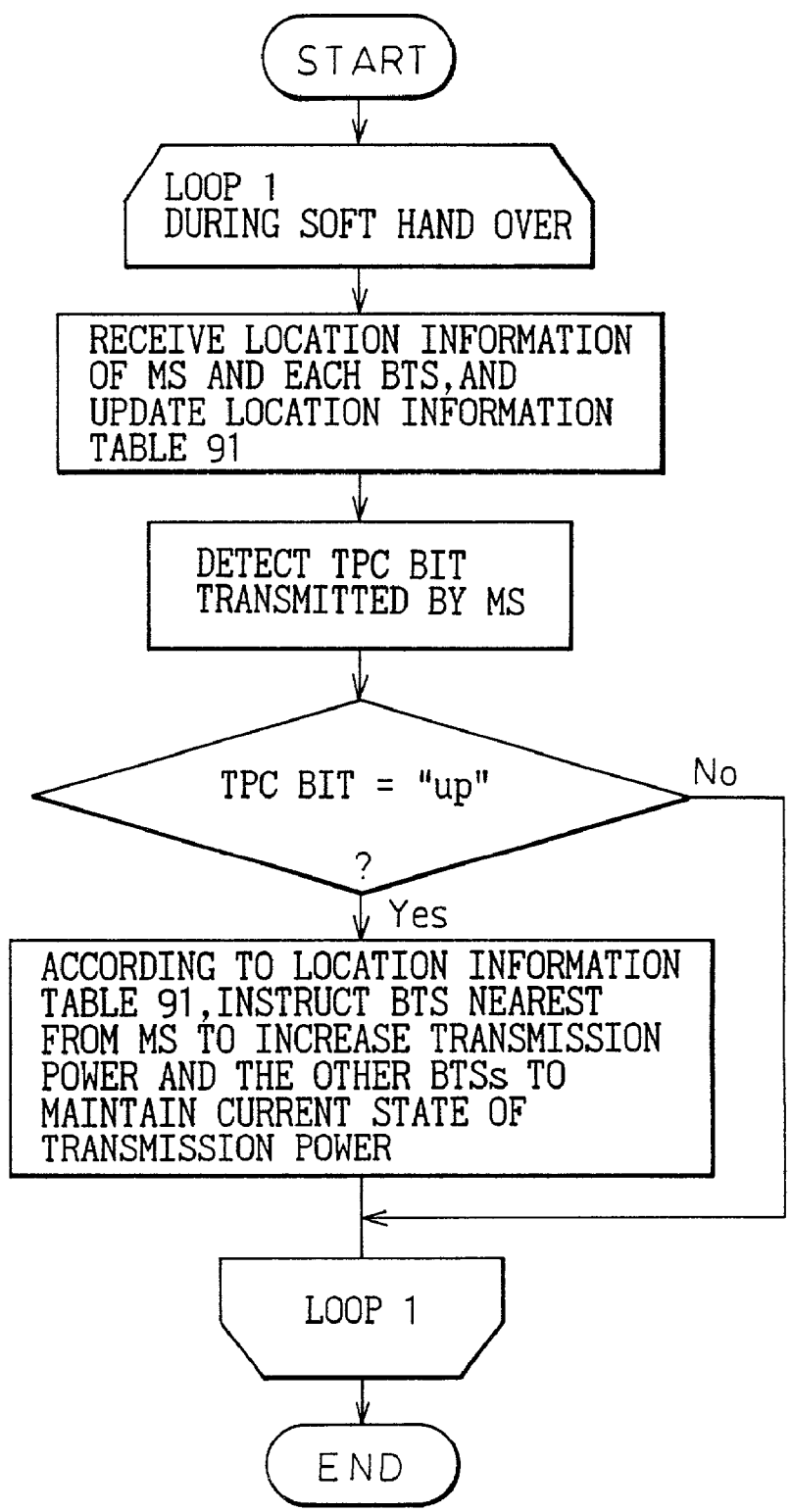
FIG. 15 is a flow chart of a fourth aspect of the flow of processing.

FIG. 15 is a flow chart of a fourth aspect of the flow of processing.

The fourth aspect is for the case where a base transceiver station is provided with a GPS and is the same as the second aspect explained above (FIG. 13).

In the second step of the figure, however, the location information of other base transceiver stations is received through the base transceiver station control apparatus RNC.

As explained above, according to the present invention, it is possible to reduce interference during handover. Further, it is possible to keep down an increase in the overall amount of power emitted in the mobile communications system and thereby further increase the number of subscribers (number of mobile stations) which can be handled by the system.

Further, it is possible to reduce the interference with other mobile station in communication around the mobile station.

While the invention has been described with reference to specific embodiments chosen for purpose of illustration, it should be apparent that numerous modifications could be made thereto by those skilled in the art without departing from the basic concept and scope of the invention.

The invention claimed is:

1. A method for controlling transmission power at the time of handoff for transmitting the same data from at least two bas transceiver stations among a plurality of base transceiver stations to a mobile station in a mobile communication system including a plurality of base transceiver stations,
said method for controlling transmission power comprising the steps of:
specifying a base transceiver station with a larger receiving power among at least said two base transceiver stations based on a signal from said mobile station,
receiving a request for raising the transmission power from said mobile station in said at least two base transceiver stations, and
raising the transmission power of a transmission signal to said mobile station in said specified base transceiver station without raising the transmission power in all of or at least one of the unidentified base stations among the base transceiver stations receiving the request.

2. A mobile station used in a mobile communications system including at least two base transceiver stations provided with a handoff function for transmitting the same data to a mobile station and provided with the function of controlling a mobile transmission power so as to raise the transmission power in the base transceiver station nearest to said mobile station among said at least two base transceiver stations and not raise the transmission power in all or part of the other base transceiver stations when said at least two base transceiver stations receive a request for raising the transmission power from said mobile station at the time of execution of a handoff function,
said mobile station provided with:
a requesting means for transmitting a request for raising the transmission power at the time of handoff and
a mobile station location information generating means for measuring the position of the mobile station and transmits the measured location information to a communicating base transceiver station before transmitting the request when the quality of the received signal from the communicating base transceiver station falls below a predetermined quality.

3. A mobile station as set forth in claim 2 wherein said mobile station location information generating means transmits the location information of the mobile station from the start of handoff to the end of handoff periodically or in accordance with the change in position of that station.

4. A base transceiver station used in a mobile communications system provided with a handoff function for transmitting the same data as at least one other base transceiver station to the same mobile station,
said base transceiver station provided with
a confirming means for judging if said base transceiver station is nearer to said mobile station than said at least one other base transceiver station and
a transmission power control means for raising a transmission power of a signal transmitted to the mobile station by a handoff function when receiving a request for raising the transmission power from said mobile station at the time of handoff when said judgment judges that said base transceiver station is nearest.

5. A base transceiver station host equipment for controlling a first base transceiver station provided with a handoff function for transmitting the same data as data from at least one other base transceiver station to a certain mobile station to raise the transmission power of a signal transmitted to said certain mobile station when said first base transceiver station is nearer to said certain mobile station than at least one other base transceiver stations when receiving a request for raising the transmission power from said certain mobile station during execution of said handoff function,
said base transceiver station host apparatus provided with
a confirming means for specifying a base transceiver station nearest to said certain mobile station from among said first base transceiver station and said at least one other base transceiver station and
a notifying means for notifying the specified base transceiver station that it is nearest.

6. A method for controlling transmission power at the time of handoff for transmitting the same data from at least two base transceiver stations among a plurality of base transceiver stations to a mobile station in a mobile communication system including a plurality of base transceiver stations,
said method for controlling transmission power comprising the steps of:
receiving a signal from said mobile station at said at least two base transceiver stations and specifying a base transceiver station with a largest received field strength,
receiving a request for raising the transmission power from said mobile station in said at least two base transceiver stations, and
raising the transmission power of a transmission signal to said mobile station in said specified base transceiver station without raising the transmission power in all or at least one of the unspecified base transceiver stations among the base transceiver stations receiving the request.

7. A method for controlling transmission power at the time of handoff for transmitting the same data from at least two base transceiver stations among a plurality of base transceiver stations to a mobile station in a mobile communication system including a plurality of base transceiver stations, said method for controlling transmission power comprising the steps of:
specifying a base transceiver station with a largest received field strength in said mobile station among signals received from said at least two base transceiver stations based on a signal from said mobile station,
receiving a request for raising the transmission power from said mobile station in said at least two base transceiver stations, and
raising the transmission power of a transmission signal to said mobile station in said specified base transceiver station without raising the transmission power in all or at least one of the unspecified base transceiver stations among the base transceiver stations receiving the request.

8. A base transceiver station used in a mobile communication system provided with a handoff function for transmitting the same data as data from an adjoining at least one other base transceiver station to the same mobile station,
said base transceiver station provided with
a first confirming means for judging if said base transceiver station is nearer to said mobile station than said adjoining at least one other base transceiver station,
a second confirming means for judging if said base transceiver station is farther from said mobile station than said adjoining at least one other base transceiver station, and
a transmission power control means for raising a transmission power of a signal transmitted to the mobile station by a handoff function when receiving a request for raising the transmission power from said mobile station at the time of handoff when said first confirming means judges that said base transceiver station is nearest and not raising a transmission power of a signal to the mobile station by a handoff function when receiving a request for raising the transmission power from said mobile station at the time of handoff when said second confirming means judges that said base transceiver station is farthest.

9. A base transceiver station used in a mobile communications system provided with a handoff function for transmitting the same data as data from an adjoining at least one other base transceiver station to the same mobile station,
said base transceiver station provided with
a confirming means for judging if said base transceiver station is nearer to said mobile station than said adjoining at least one other base transceiver station and
a transmission power control means for raising a transmission power of a signal transmitted to the mobile station by a handoff function when receiving a request for raising the transmission power from said mobile station at the time of handoff when said judgment judges that said base transceiver is nearest and not raising a transmission power of a signal transmitted to the mobile station by a handoff function when receiving a request for raising the transmission power from said mobile station at the time of handoff when said judgment does not judge that said base transceiver station is nearest.

10. A base transceiver station host equipment for controlling a first base transceiver station provided with a handoff function for transmitting the same data as data from at least one other base transceiver stations to a certain mobile station to raise the transmission power of the base transceiver station to said certain mobile station when said first base transceiver station is nearer to said certain mobile station than said at least one other base transceiver stations when receiving a request for raising the transmission power from said certain mobile station during execution of said handoff function and to not raise the transmission power of the base transceiver station to said certain mobile station when it is farthest,
said base station transceiver station host equipment provided with
a confirming means for specifying a base transceiver station nearest to said certain mobile station and a base transceiver station farthest from it among said first base transceiver station and said at least one other base transceiver station and
a notifying means for notifying the base transceiver station specified as nearest that it is nearest and notifying the base transceiver station specified as farthest that it is farthest.

11. A method for controlling downlink transmission power for controlling the transmission power from a base transceiver station to a mobile station in a mobile communications system having at least one mobile station and a plurality of base transceiver stations,
said method for controlling downlink transmission power comprising the steps of:
transmitting a request for raising the transmission power from said mobile station to a plurality of base transceiver stations in the middle of handover with said mobile station,
receiving said request and finding magnitudes of the distance between said mobile station and said plurality of base transceiver stations,
specifying the one base transceiver station with the smallest distance, and
raising the transmission power only from the specified base transceiver station.

12. A base transceiver station provided with a proximity confirming unit for confirming if said base transceiver station is nearest to a mobile station based on location information relating to the position of the mobile station and the position of another base transceiver station in the middle of handover with said mobile station when in the middle of handover with said mobile station and receiving a request for raising the transmission power from said mobile station and
raising the transmission power to said mobile station only when confirming that the base transceiver station is nearest to said mobile station.

13. A base transceiver station host equipment linked with a mobile station and a plurality of base transceiver station and able to control handover,
said base transceiver station host equipment provided with:
a location information storage unit for storing location information relating to the positions of said mobile station and said plurality of base transceiver station and
a base transceiver station indicating unit for indicating the one base transceiver station nearest to said mobile station among said plurality of base transceiver stations based on said location information only when said mobile station and said plurality of base transceiver stations are in the middle of handover and a request for raising the transmission power is transmitted from said mobile station to said plurality of base transceiver stations and instructing only said indicated base transceiver station to respond to said request to raise the transmission power.

14. A base transceiver station as set forth in claim 12, wherein said base transceiver station is thither provided with a memory holding the position of the base transceiver station and positions of other base transceiver stations in advance as fixed data.

15. A base transceiver station as set forth in claim 12, wherein said base transceiver station further has a memory for receiving and storing said location information held by said base transceiver station host equipment from said base transceiver station host equipment.

16. A base transceiver station receiving a notification from a base transceiver station host equipment to the effect of being nearest to a mobile station from location information relating to the position of said mobile station and the positions of base transceiver stations simultaneously in the middle of handover with said mobile station and raising the transmission power to said mobile station when in the middle of handover with the mobile station and receiving a request for raising the transmission power from said mobile station.

17. A base transceiver station host equipment as set forth in claim 13, wherein said location information storage unit has a memory for collecting and storing said location information transmitted from said plurality of base transceiver stations and said location information of said mobile station transferred from said mobile station through said base transceiver station.

18. A base transceiver station host equipment as set forth in claim 13, wherein said location information storage unit has a memory for holding said location information of said plurality of base transceiver stations in advance as fixed data and collecting and holding said location information of said mobile station transferred from said mobile station through said base transceiver station.

* * * * *